(12) United States Patent
Bush et al.

(10) Patent No.: US 8,146,298 B2
(45) Date of Patent: Apr. 3, 2012

(54) FIRE-RESISTANT STRUCTURES, FIRE-RESISTANT INSULATIONS AND A METHOD FOR FIRE-PROTECTION

(75) Inventors: Theodore K. Bush, Honolulu, HI (US); Hana Verny, Palo Alto, CA (US)

(73) Assignee: Pelefiregard LLC, Honolulu, HI (US)

( * ) Notice: Subject to any disclaimer, the term of this patent is extended or adjusted under 35 U.S.C. 154(b) by 5 days.

(21) Appl. No.: 12/768,092

(22) Filed: Apr. 27, 2010

(65) Prior Publication Data

US 2010/0269449 A1 Oct. 28, 2010

Related U.S. Application Data

(60) Provisional application No. 61/173,454, filed on Apr. 28, 2009.

(51) Int. Cl.
*E04B 7/00* (2006.01)
(52) U.S. Cl. ............... 52/23; 52/3; 52/745.06; 428/116
(58) Field of Classification Search ............... 52/23, 3, 52/4, DIG. 14, 745.06; 428/116, 118, 73
See application file for complete search history.

(56) References Cited

U.S. PATENT DOCUMENTS

| | | | |
|---|---|---|---|
| 3,948,295 A * | 4/1976 | Lemont et al. ............... 138/147 |
| 4,168,347 A | 9/1979 | Spicuzza, Jr. et al. |
| 4,550,046 A | 10/1985 | Miller |
| 4,567,076 A * | 1/1986 | Therrien ....................... 428/102 |
| 4,598,007 A | 7/1986 | Kourtides et al. |
| 4,675,379 A | 6/1987 | Mikroyannidis et al. |
| 4,733,512 A | 3/1988 | Kiselewski |
| 4,767,656 A | 8/1988 | Chee et al. |
| 4,775,740 A | 10/1988 | Beggs et al. |
| 5,038,693 A | 8/1991 | Kourtides et al. |
| 5,277,959 A | 1/1994 | Kourtides et al. |
| 5,545,273 A | 8/1996 | Rasky et al. |
| 5,558,932 A * | 9/1996 | Scanlon ........................ 442/277 |
| 5,608,992 A * | 3/1997 | Floyd ................................ 52/3 |
| 5,630,296 A * | 5/1997 | Kendall, Jr. ................... 52/2.11 |
| 5,740,643 A | 4/1998 | Huntley |
| 5,744,252 A | 4/1998 | Rasky et al. |
| 5,748,072 A * | 5/1998 | Wang ..................... 340/286.05 |
| 5,811,168 A | 9/1998 | Rasky |
| 5,829,200 A * | 11/1998 | Jones et al. ......................... 52/3 |
| 5,860,251 A * | 1/1999 | Gleich ............................ 52/2.25 |
| 5,871,857 A * | 2/1999 | Alhamad ....................... 428/703 |
| 6,114,003 A * | 9/2000 | Gottfried ........................ 428/73 |
| 6,503,596 B1 | 1/2003 | Fellman |
| 6,810,626 B2 * | 11/2004 | Meyer et al. ...................... 52/1 |
| 2006/0277830 A1 * | 12/2006 | Boggs, Jr. ..................... 52/2.22 |

OTHER PUBLICATIONS

Canadian Forest Service Report, www.nofc.forestry.ca/fire, Forest Fire in Canada, National Site Canadian Forest Service, pp. 1-2.
International Search Report and Written Opinion, PCT/US2011/033880, issued Jul. 8, 2011.

* cited by examiner

*Primary Examiner* — Brian Glessner
*Assistant Examiner* — Brian D Mattei
(74) *Attorney, Agent, or Firm* — Peters Verny, LLP; Hana Verny

(57) ABSTRACT

Fire-resistant structures, fire-resistant insulations and a method for fire-proofing and fire-protection of permanent or temporary structures or objects. The fire-resistant insulation withstands temperatures between 1200° C. and 2000° C. on the exterior side of the insulation, and the interior side provides a shield for fire-protected structure or object against temperatures not exceeding 300° C. A method for fire-protection comprises steps of providing a fire-protection for structures and objects subjected to fires, brush-fires or fire storms.

21 Claims, 13 Drawing Sheets

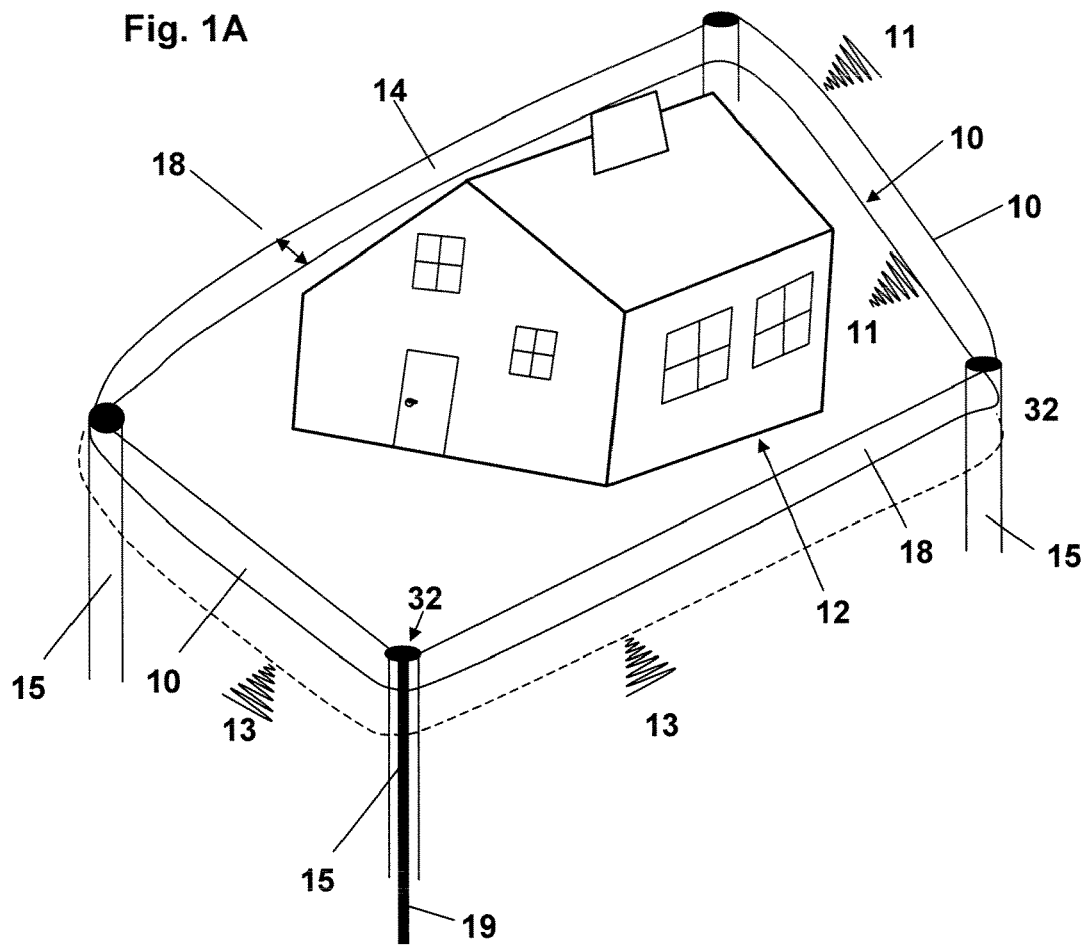
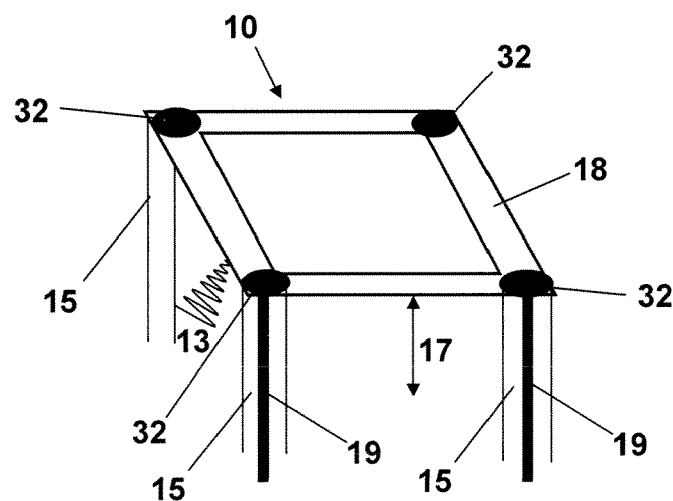

Fig. 7A
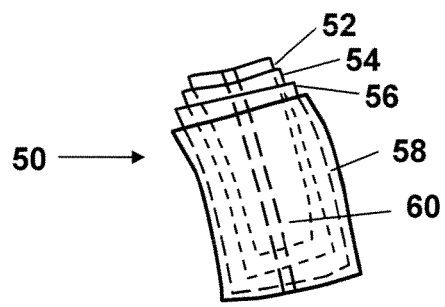
Fig. 7B
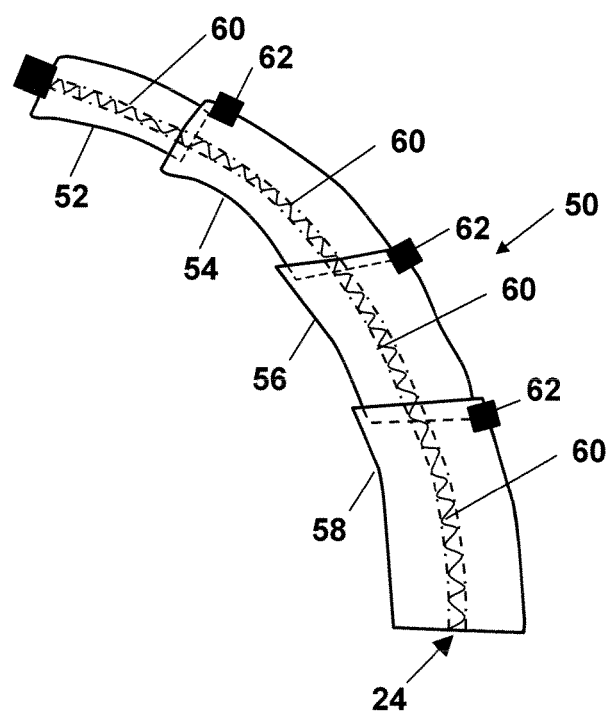
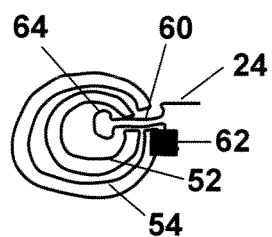
Fig. 7C

FIRE-RESISTANT STRUCTURES, FIRE-RESISTANT INSULATIONS AND A METHOD FOR FIRE-PROTECTION

This application claims priority of the Provisional application Ser. No. 61/173,454 filed on Apr. 28, 2009.

BACKGROUND OF THE INVENTION

1. Field of the Invention

The current invention concerns fire-resistant structures, fire-resistant insulations and a method for fire-proofing and fire-protection of permanent or temporary structures or objects. The fire-resistant structures comprise essentially of the fire-resistant insulation having a thermo-insulating capacities and thermo-insulating gradient wherein on the exterior side of the insulation, the insulation withstands temperatures of at least 1200° C. and up to 2000° C. and wherein on the interior side, closest to the structures and objects to be fire-protected, the insulation provides a protective shield for the fire-protected structure or object assuring that the temperature at the fire-protected structure reaches optimally only the temperature of about 120° C. and does not exceed 300° C.

The fire-resistant insulation is a composite covering comprising several layers of materials having different fire-resistant and insulating properties, said layers placed over and/or attached to each other thereby cumulatively providing fire-resistant insulation for protection against fires reaching temperatures up to 2000° C. for extended period of time. The fire-resistant structures are either made or built of such insulation, comprise such insulation or are covered with such insulation.

The fire-resistant composite covering can be a sheath or two sheaths connected together, or two circumferentially connected sheaths to form an inflatable cavity, a blanket or two blankets connected together or two connected blankets to form an inflatable cavity or a blanket and a sheath connected together to form an inflatable cavity. The fire-resistant composite covering may also be a tent or a tent-like structure made of a fire-resistant insulation permanently attached to or temporarily placed on or erected over the structure to be fire-protected.

Fire-resistant insulations of the invention are suitable for fire-protection or fire-proofing of various structures and objects such as houses, buildings, industrial plants, gardens, lawns, individual trees or forests or other permanent or temporary structures and provide protection against fires or firestorms or may be simply used as a fire barrier on the outskirt of the brush-fire to prevent fire spread.

2. Background and Related Disclosures

Fires, particularly fierce brush fires, bush fires and wildfires that affect large acreages and results in destruction of households, businesses, buildings, industrial plants or other structures, as well as forests, pastures or parks are all too common. They result in great personal tragedies, natural disasters as well as in immense economic losses. These fires may be caused by or connected with lightning, storms, firestorms, earthquakes, hurricanes, tornadoes, natural causes, human negligence or arson. Many of these fires spread quickly and become uncontrollable.

Temperatures of these fires can, at certain points, reach 1400° C. and may easily reach temperatures over 1600° C. Moreover, such fires may be caused or accompanied by winds, or wind gusts reaching up to 150 miles/hour. Whatever their origin, these fires are extremely dangerous and very hard to bring under control. Additionally, some of the fires, for example, bush or forest fires may advance at a rate of from 0.5 km/hour to more than 6 km/hour. The speed and intensity of these fires depends on the type of terrain and on weather conditions. The flames of these fires may reach the height up to 50 meters. These kinds of fires often exceed temperatures above 1600° C. and, under extreme conditions, can give off 10,000 kilowatts per meter of fire front (Canadian Forest Service Report at www.nofc.forestry.ca/fire). Additionally, many of the fires end up becoming firestorms.

Firestorms are conflagrations which attain such intensity that they create and sustain their own wind system. This phenomenon is particularly often observed in bush fires, brush fires, forest fires and wildfires. The firestorms are created as a result of the stack effect occurring when the heat of the original fire draws in more and more of surrounding air, thereby creating turbulence and erratic changes in wind direction. The wind shear generated during firestorms is capable of producing small tornado-like fire whirls that may result in a quick spread of fire not only to adjacent but also to more remote areas. Moreover, the draft generated during firestorms may draw in large quantities of oxygen thereby significantly increasing heat and combustion.

Clearly, the uncontrollable fires and firestorms create very dangerous and economically unsustainable conditions and problems and there is a continuing need to provide solutions to these problems.

Although throughout the years attempts were made to provide solutions to these problems, so far there is no reliable, practical and economical way to protect houses, businesses and other structures and objects from these uncontrollable fires and firestorms.

It would therefore be advantageous to provide means for protecting housing, buildings, trees, forests, gardens, bushes and other structures and objects from fires and firestorms having extremely high temperatures and also those that are accompanied by winds or other extreme conditions that further prevent these fires to be controlled and extinguished.

One attempt to provide protection for housing structures against the fire disclosed in the U.S. Pat. No. 4,168,347, issued on Sep. 18, 1979, describes highly heat and flame resistant articles of manufacture comprising a swellable fire retardant composition containing a reaction product of phosphoric acid and a reducing sugar in association with a fire unstable material. Disadvantage of this approach is that the intumescent composition, when exposed to heat, softens and produces voluminous foam eventually resulting in a black carbonaceous char, definitely not a desirous result for home or business owners.

U.S. Pat. No. 6,503,596 issued on Jan. 7, 2003, discloses a composite firewall structure fabricated of a sheet of carbon-carbon material formed with first and second sides where the first side of the sheet is able to prevent the flame to penetrate the composite from the first side to the second side for 15 minutes. A problem with this composite is that the composite firewall provides only approximately 15 minutes protection for a fire of up to only about 1093° C. (2000° F.) temperature whereas the brush fires often reach temperatures of about 1600° C. and last for several hours or even days.

U.S. Pat. No. 4,767,656, issued on Aug. 30, 1988, discloses a load-bearing composite material structure having a plurality of layers of composite materials. Each layer includes a matrix material that withstands temperature of about 649° C. (1200° F.) for about five minutes. Outer surface directly exposed to a fire includes a barrier resistant to temperature of about 1093° C. (2000° F.) for at least fifteen minutes. All these layers are bonded together to form a single load bearing and substantially fire-resistant structure. However, as in other disclosures, this composite is able to protect the structure from fire for only about 15 minutes and only from temperatures of about 1193° C. (2000° F.). Such composite would not be suitable for protection of housing or building during fires and firestorms that have temperatures up to and above 1600° C. and often last several hours or days, that is, much longer than 15 minutes.

In another attempt to provide a fire protection, the U.S. Pat. No. 5,740,643 issued on Apr. 21, 1998, discloses a fire-proof and hurricane resistant building that comprises a concrete floor, and a plurality of special wall and roof assemblies. The walls further comprise a reinforced cinder block walls, foams, stucco, fire-proof coating, steel studs and fire retardant gypsum plaster. The roof comprises steel trusses, steel joints, metal sheaths and fire-proof tiles. Such complex fire-proofing makes this fire-proof building very costly and impractical for protection of an ordinary housing because of its weight, complexity and, ultimately, also a cost.

Thus it would be advantageous to provide fire-resistant insulation that would be practical, lightweight, durable, storageable and affordable and could be easily attachable to various structures to make these structures fire-resistant wherein such insulation would provide a fire protection for said fire-resistant structures for extended time of several hours or days against high temperatures fires, particularly the fires that last several days and that reach high temperatures well over those disclosed in the prior art.

It is, therefore, a primary object of this invention to provide fire-resistant insulations, fire-resistant structures and fire-resistant coverings and means for attaching said fire-resistant insulations and coverings to said structures as well as a method for protecting structures and objects against high temperature fires reaching temperatures over 1200° C. and up to 2000° C. for extended periods of time longer than 15 minutes.

All patents and patent application cited herein are herein incorporated by reference in their entirety.

SUMMARY

One aspect of the current invention is a fire-resistant structure or object that is made, built, covered with, contains, or generally comprises a fire-resistant insulation wherein said insulation is a composite covering comprising one layer or a plurality of layers of materials having a different thermo-insulating capacity, wherein said insulation can withstand external temperatures between 1200° C. and 2000° C. on its exterior side and wherein said insulation on its interior side closest to the structures and objects to be protected from fire provides a shield protecting said fire-resistant structure from temperatures reaching above 300° C.

Still another aspect of the current invention is a one-ply fire-resistant insulation having an external layer, facing the fire, and internal layer, facing a structure to be protected, wherein each external and internal layer is either connected to each other or is interspaced with a cavity, inflatable cavity or a plurality of intermediate layers of the same or different materials wherein the material for each external, internal or intermediate layer is selected from the group consisting of silica, aluminoborosilicate, silicon carbide or organometallic polymer comprising silicon, organometallic polymer comprising titanium, organometallic polymer comprising carbon, organometallic polymer comprising oxygen, a scrim fabric containing aluminoborosilicate, scrim fabric containing silica, felt containing silica, felt containing alumina, felt containing aluminoborosilicate, polyimide film, poly(vinyl fluoride) film, poly(ether ketone) film, aluminum foil, polyimide film containing gold, polyimide film containing aluminum, mat containing silica, mat containing aluminoborosilicate and a combination thereof wherein said layers have a flat, plane or honeycomb pattern.

Another aspect of the current invention is a one or two-ply fire-resistant insulation wherein each ply is made of a composite covering comprising one layer or a plurality of layers of different materials having a different thermo-insulating capacity, wherein said materials may be flat, plane or may have a honeycomb or another pattern.

Yet another aspect of the current invention is a two-ply fire-resistant insulation comprising of two separate fire-resistant insulations attached together at their circumferential edges thereby forming an internal inflatable cavity permitting inflating of said cavity into a tent, tent-like or flat cover for a fire-protection of various structures and objects.

Still yet another aspect of the current invention is a fire-protected structure comprising a one or two-ply thermo-resistant insulation capable of withstanding temperatures from about 1200° C. and up to 2000° C. or is covered with such insulation, wherein said structure is made or built of said insulation, comprises such insulation, is covered with such insulation or wherein such insulation is separate from said structure and is used to cover said structure in case of fire and wherein when said structure is made or built of said insulation, said insulation is attached to and/or stored in a fire-resistant structural support or wherein such insulation further comprises elements providing such structural support and wherein when said structure comprises said insulation, said insulation is built into walls, roofs, windows or doors of said structure, into storage compartments placed underground and surrounding said structure or is built into or attached to said structure as a mechanically or manually releasable component.

Another aspect of the current invention is a fire-resistant structure or object that has been fire-protected with a fire-resistant insulation able to withstand temperatures up to about 2000° C., wherein said fire-protected structure or object is a house, building, garage, warehouse, industrial plant, ground, garden, lawn, grass, tree, bush, brush, forest or any other structure or object needing fire-protection.

Still another aspect of the current invention is a method for fire-protection comprising steps of providing a fire-resistant insulation capable of withstanding temperatures between 1200° C. and 2000° C. and attaching said insulation to a structure or object such that said structure or object is made of said insulation, said insulation is built into said structure or object, said insulation covers said structure or object or such insulation is separate from said structure or object and is used to cover said structure or object in case of fire and wherein said insulation has one or several layers that are exterior, interior and intermediate, wherein said layers are made of the same or different material and wherein an exterior layer is positioned at an outermost exterior side of the insulation covering said structure or object and is capable of withstanding temperature of up to 2000° C. and wherein the interior layer positioned at an innermost interior side of the insulation, said interior layer provides an insulation for said structure wherein in case of an exterior fire said structure is subjected only to temperatures of about 120° C. and not exceeding 300° C.

Yet another aspect of the current invention is a method for fire-protecting a structure or object wherein said method comprises steps of making or building said structure or object using a fire-resistant insulation capable of withstanding temperatures up to 2000° C., alone or in a combination with other structural elements, wherein such insulation is attached to a fire-resistant structural support or provides an insulation that comprises a structural support and wherein when said structure or object comprises said insulation, said insulation is built into walls, roofs, windows or doors of said structure, into grounds surrounding said structure or is built into or attached to said structure as a mechanically or manually releasable component or, in case of the object, it tightly surrounds or covers the object.

Still yet another aspect of the current invention is a one or two-ply fire-resistant insulation providing covering for a structure or object to be protected that is permanently built into and stored in storage compartments surrounding a perimeter of a structure or object to be protected from the fire, wherein such fire-resistant structure comprises insulation that is impermeably attached to a metal support able to withstand wind or a gusts of wind having a speed of up to 150 miles/hour and wherein such fire-resistant insulation may be erected or otherwise attached to or placed around the structure to be fire-protected in case of the fire.

Still yet another aspect of the current invention is a fire-resistant one or two-ply insulation comprising means for inflating or otherwise expanding said fire-resistant insulation into a field or ground covering.

Still yet another aspect of the current invention is a fire-resistant insulation wherein on the exterior side of the insulation, the insulation withstands temperatures up to 2000° C. and wherein on the interior side, the insulation provides a shield for structures to be protected to reach temperatures no higher than 300° C.

BRIEF DESCRIPTION OF DRAWINGS

FIG. 1A shows a house structure to be protected from fire surrounded by a storage compartment buried underground around the whole perimeter of the house with a fire-resistant insulation stored within said compartment. FIG. 1B shows placement of the storage compartments underground and secured with anchoring rods.

FIG. 7 shows components of a collapsible metal supporting frame for a fire-resistant insulation folded (collapsed) for storing (FIG. 7A), extended for use (FIG. 7B). A rolled fire-resistant insulation is stored in the storage compartment and is attached to a supporting frame at the gap points (FIG. 7C).

FIG. 8 shows other embodiments of a supporting frame.

FIG. 8B shows the supporting frame formed of a plurality of foldable linkages in unfolded state for use. Preferred embodiments of the foldable linkages are shown in FIG. 8C and FIG. 8D, wherein FIG. 8C shows a single segment of the linkage with attachment groove for attachment of a fire-resistant insulation and a servomotor as a means for unfolding the linkages along the pivot pin, and wherein

DEFINITIONS

Figure 2A:
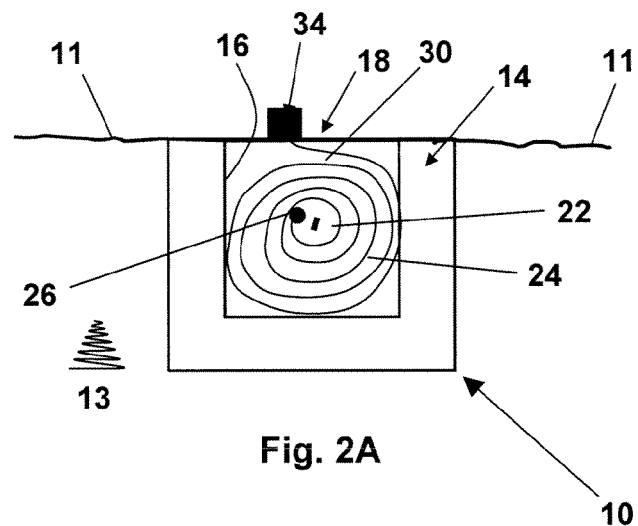
FIG. 2A is a side view of a storage compartment showing a storage of a fire-resistant insulation as a roll rolled and stored within a storage compartment.

As used herein:

"Structure" means any permanent or temporary man-made or naturally occurring structure, such as for example, a house, building, warehouse, garage, shed, hangar, tree, bush or forest that can be advantageously fire-protected by incorporating a fire-resistant insulation into said structure or by covering said structure with such insulation.

"Object" means a permanent or temporary man-made or naturally occurring ground, garden, tree, lawn, bush, brush, soil and such other things.

"Fire-resistant structure" means a structure that is build, covered or contains a fire-resistant insulation or an insulation composite covering.

"Fire-resistant insulation" or "insulation" means a one or two-ply composite covering consisting of one layer or a plurality of layers wherein said layers are made of the same of different materials having an insulating capacity to protect the exterior of the structure or object from fire temperature exceeding 1200° C. up to 2000° C. and to protect the structure from the heat reaching temperatures above 120° C. and not exceeding 300° C. on the interior side of the insulation.

"Storage housing compartment" or "storage compartment" means an underground or above the ground placed structure that is used for storing the fire-resistant insulation of the invention before deployment. The storage compartment may additionally also store the means for deployment of the insulation and for its attachment.

"Blanket" means a fire-resistant insulation that comprises a plurality of layers that may have different functions and thermal properties. Blanket typically comprises more layers than a sheath. Blanket would typically comprise of between two and thirty layers and, in rare instance, may have up to a hundred layers. The layers in the blanket are flat, have a honeycomb pattern or a combination of both. The blanket may have thickness from about 0.5 to about 5 cm and may be used as such or as an interior but preferably as an exterior layer in a two-ply insulation.

"Sheath" means one or several, typically one to about five layers of a flat or plane sheets of materials joined together to form a thin sheath having thickness between about 0.1 to about 1 cm. Sheath may also have one or two honeycomb pattern layers. The sheath may be used as an exterior but preferably as an interior layer in a two-ply fire-resistant insulation.

"Exterior layer" means an exterior layer that is positioned at an outermost exterior side of a fire-resistant insulation that is capable of withstanding temperature of up to 2000° C. The exterior layer has high reflectivity and low emissivity, as defined below.

"Intermediate layer" is a layer of material placed in between an exterior layer and an interior layer. Typically, there is a plurality of intermediate layers and these layers are made of different materials having different thermo-resistant properties and are typically made of material selected from the group consisting of silica, aluminoborosilicate, silicon carbide or organometallic polymer comprising silicon, organometallic polymer comprising titanium, organometallic polymer comprising carbon, organometallic polymer comprising oxygen, a scrim fabric containing aluminoborosilicate, scrim fabric containing silica, felt containing silica, felt containing alumina, felt containing aluminoborosilicate, polyimide film, poly(vinyl fluoride) film, poly(ether ketone) film, aluminum foil, polyimide film containing gold, polyimide film containing aluminum, mat containing silica, mat containing aluminoborosilicate and a combination thereof, wherein the thermo-resistant properties of each intermediate layer is between 120° C. and 2000° C.

"Interior layer" is an interior layer positioned at an innermost side of the insulation that is in contact with a structure or object to be fire-protected that provides an insulation for said structure or object in case of an exterior fire and has properties assuring that said structure or object is subjected only to temperatures of between 120° C. and 200° C. and not exceeding 300° C. The interior layer has a low emissivity.

"Emissivity" or "emissivity of the insulation" means the amount of radiant heat energy absorbed by a surface (exterior layer), conducted through the insulation mass (intermediate layer), and then emitted or re-radiated through the opposite side (interior layer) of the fire-resistant insulation. The lower the emissivity value, the greater the insulating protection from radiant energy and heat transfer.

"Reflectivity" means the opposite of emissivity, that is, it is the ability that a surface has to reflect radiant heat energy. The higher the reflectivity, the less potential a material of the exterior layer has to absorb radiant heat and thus the less heat is conducted through its mass, and emitted through the opposite side, that is, through the interior layer. The higher reflectivity, the better insulation properties of the fire-resistant insulation.

"Thermo-insulating gradient" means gradient where at the exterior layer, a fire-resistant insulation has a fire-resistance capability to withstand fire having temperatures above 1200° C. and up to about 2000° C., and at the interior layer, i.e. a side facing a structure or object to be fire-protected, the fire-resistant insulation has a capability to maintain and provide a shield for reaching maximal temperatures of from about 120° C. and not exceeding 300° C. temperature in said structures or objects.

"Backside temperature" means temperature on the interior layer of the insulation facing the structure or object to be fire-protected. The backside temperature is expressed as a function of time after exposure of the exterior layer surface to temperatures above 1200° C. and up to 2000° C.

"Two-ply fire-resistant insulation" means an insulation comprising of two separate fire-resistant insulations such as sheaths or blankets attached together at their circumferential edges thereby forming an internal inflatable cavity permitting inflating of said cavity into a box, tent, tent-like covering or flat covering for a fire-protection of various structures and objects. Typically, it is comprised of a sheath or two sheaths connected together forming an inflatable cavity, a blanket or two blankets connected together forming an inflatable cavity, blanket and a sheath connected together forming an inflatable cavity or a tent made of a fire-resistant insulation permanently attached to the structure or temporarily placed on or erected over the structure.

"Plane" means a flat two-dimensional surface, similar to a sheet of paper.

"Honeycomb" means a three-dimensional structure of hexagonal, thin-walled cells resembling a honeycomb constructed from beeswax by honeybees.

DETAILED DESCRIPTION OF THE INVENTION

The current invention concerns fire-resistant structures, fire-resistant coverings, fire-resistant insulations and a method for fire-protection of permanent or temporary man-made or naturally occurring structures and objects. The invention further concerns a method for providing the fire-resistant structures and insulations as well as a method for protecting said permanent or temporary structures against fire.

I. Fire-Resistant Structures and Objects

The fire-resistant structures and objects are generally all structures or objects that can be protected against fire according to this invention. Thus these structures or objects include but are not limited to houses, buildings, garages, sheds, warehouses, industrial plants, grounds, gardens, lawns, soil, grasses, trees, brushes, bushes and forests.

The fire-resistant structures comprise essentially of the fire-resistant insulation having a thermo-resistant gradient, said insulation comprising of one or, preferably, several layers of material having a different thermo-resistant properties on the exterior and on the interior sides, wherein on the exterior side of the insulation, the insulation withstands temperatures above 1200° C. and may withstand temperatures up to 2000° C. and wherein on the interior side, the insulation provides a shield for structures and objects to be protected to reach temperatures between 120° C. and no higher than 300° C., in order to protect the structure or the object as well as a content of the structure or the object from the heat destruction. The insulation, therefore, comprises one or several layers of a material having different thermo-resistant gradient, cumulatively providing resistance to temperatures from as high as 2000° C. to as low as 120° C. The fire-resistant structures are either made or built of such insulation, or comprise such insulation or are covered with such insulation.

The fire-resistant structure or object is made, built, covered with, or contains, and generally comprises, a fire-resistant insulation wherein said insulation is a one or two-ply composite blanket or sheath comprising of one or a plurality of layers of materials having a different thermo-insulating capacity. The insulation can withstand external temperatures between 1200° C. and 2000° C. on its exterior side and on its interior side, closest to the structures and objects to be protected from fire, it provides a shield protecting said fire-resistant structure from temperatures reaching above 300° C. and preferably not above 120° C.

The fire-resistant structure or object that is protected against fire according to the current invention is either covered permanently or temporarily with a fire-resistant insulation, or is fabricated in whole or in part of such insulation or such insulation is built into such structure or object, or comprises such insulation.

A. Permanently Attached Insulations

When the structure or object is fire-protected with a fire-resistant insulation, such insulation may be in-built permanently into the walls, roofs, floors, ceilings, doors, windows or may be permanently placed and stored in a storage compartment surrounding said structure or object from which it is easily deployable. The storage compartments are placed either underground or above the ground. When the insulation is stored in said compartments, it may be advantageously erected, mounted or deployed using a manual or mechanical means. When said structure is made or built of said insulation, said insulation is attached to and/or stored in a fire-resistant structural support that may be in-built into said structure or object, or such insulation may further comprise elements providing such structural support, or such insulation may be built or stored in storage compartments placed into grounds surrounding said structure, or be built into or attached to said structure as a mechanically or manually releasable components.

In one preferred embodiment, in case of fire, the structure is covered with a box or tent like insulation cover that does or preferably does not touch the covered structure, such as a house or building. The insulation is stored on the exterior perimeter of the structure or object in a storage compartment, preferably in the underground storage compartment, as a roll of the insulation impermeably attached to a metal support of the storage compartment and the storage compartment is firmly anchored into the ground. Such storage compartment may be positioned closely to or even attached to the house structure or object or it may be positioned remotely, as seen in FIG. 1, from one to several feet, preferably not more than six feet, away from the house structure under or above the ground.

B. Temporary and Portable Insulations

The fire-resistant insulations of the invention may also be utilized as an unattached temporary and/or portable protection that is erected around the structure or object in case of the imminent fire. In such a case, the insulation is stored separately from said structure or object and is temporarily erected over the structure or object. The temporary insulation is used to cover said structure or object in case of the fire. Typically, the temporary insulation is portable and may be conveniently stored outside of and/or away from the structure to be fire-protected or outside of the premises and may be brought in, erected over and anchored by firefighters, owner of the house, household personnel or, for example, a company that provides tenting services for other occasions.

A preferred embodiment for these purposes is a two-ply inflatable insulation that may be deployed or erected around the structure or object by deployment of a frame erected to provide a support for the fire-resistant insulation with one embodiment allowing inflating said two-ply insulation around said structure or object, firmly anchoring it to the ground.

In another preferred embodiment, the two-ply fire-resistant insulation is erected by inflating around the structure or object as above, and when the whole structure or object is covered with said inflated insulation, the inflated two-ply insulation is deflated. The deflated insulation takes on the shape of and tightly attaches itself to said structure or object thereby essentially preventing the draft or fire to get to the covered structure or object.

In another embodiment, the two-ply insulation is inflated, deflated and the internal cavity between the two plies is again inflated forming the fire-protective cover where one ply is tightly attached to the structure, and the second ply is in inflated state.

C. Detailed Description of Various Embodiments

The invention can be implemented in a number of different ways by which a fire-resistant insulation can be quickly deployed around an existing house or other building when a fire approaches. Various components of the permanently attached insulation are generally stored in an unobtrusive manner, such as for example, underground in the storage compartment situated around the house or building, as seen in FIG. 1A. The invention additionally includes a means for a rapid deployment of said insulation, such as for example, a mechanism by which the insulation is automatically released from storage and rapidly erected, deployed and configured to form the fire-protective barrier around the house, building or object to be fire-protected.

Figure 2B:
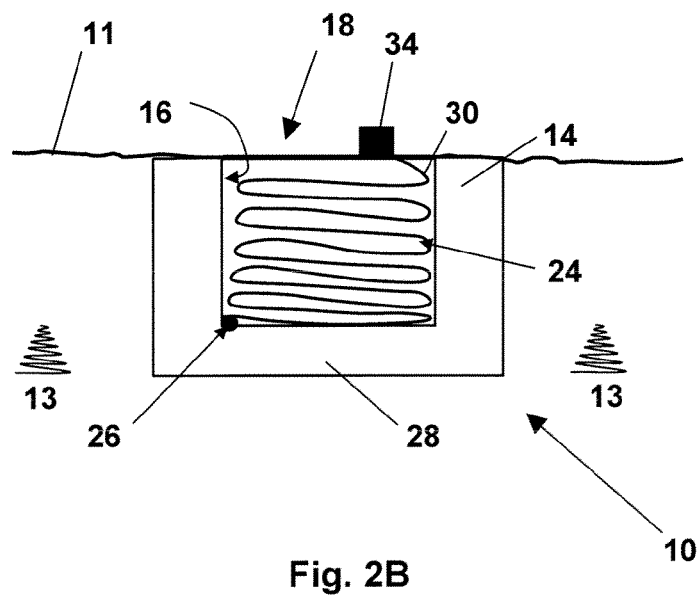
FIG. 2B is a side view of a storage compartment showing a fire-resistant insulation sheath stored folded into an accordion-like stack within said storage compartment.

In one embodiment of the invention, as shown in FIG. 1A, storage compartments 10 are placed underground 13 and positioned remotely around the perimeter of a house 12 with an upper portion of said compartment 10 covered with a readily removable cover 18 situated on the ground level 11. Storage compartments 10 are generally placed underground 13 and typically are the U-shaped long narrow straight channels 14 or U-shaped long narrow straight channel 14 with 90 degrees corners, having an interior cavity 16, as shown in FIG. 2A and FIG. 2B. The interior cavity 16 is covered with a removable cover 18, which may be automatically or manually removed when the fire-resistant insulation is to be deployed as a fire-protective barrier. The depth of the interior cavity 16 of the storage compartment may be from about a half foot to several feet, depending on the thickness, volume and length of the insulation to be stored there. The shape may be a U-shaped square for storing a wound around the roller insulation as seen in FIG. 2A, or a deep U-shaped rectangular for storing a folded insulation as seen in FIG. 2B.

Figure 3A:
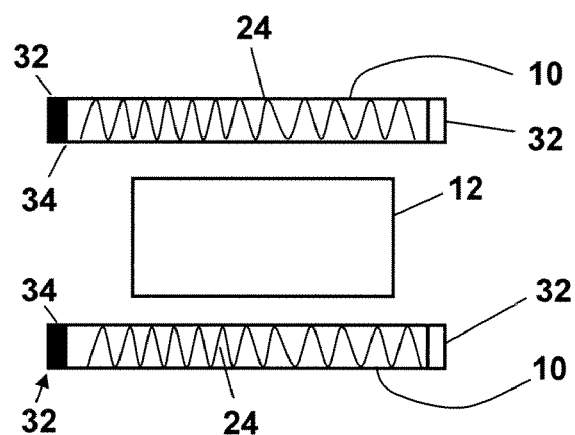
FIG. 3A is a top view of a house structure showing a placement of two storage compartments for a fire-resistant insulation on two opposed sides of the house structure.
Figure 3B:
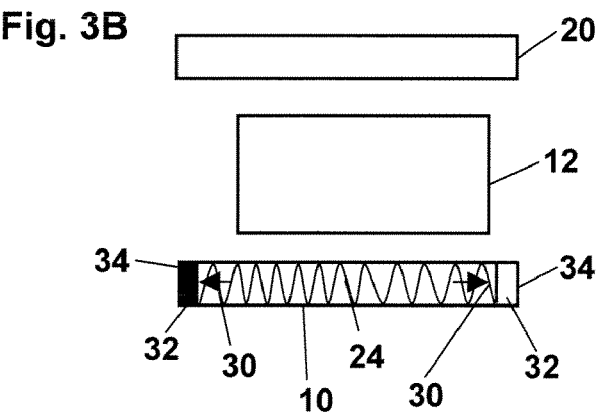
FIG. 3B is a top view of a house structure showing a placement of one storage compartment storing a fire-resistant insulation that is upon deployment extendable over the house structure and may be mounted into an anchoring compartment placed on the opposing side of the house structure. A fire-resistant insulation may be one or two-ply insulation that can be optionally inflated for deployment and deflated after deployment to provide a cover for the house structure wherein the deflated insulation takes on the shape of the house structure.

As shown in FIG. 1A, storage compartments 10 may form a rectangular configuration around the house 12, where the compartments 10 are positioned underground 13 on all four sides of the house 12. Alternatively, storage compartments 10 may extend only on two opposed sides of house 12, as shown in FIG. 3A, or there may be only a single storage compartment 10 on one side of house 12, with an anchoring compartment 20 on the opposite side, as shown in FIG. 3B. Both ends 32 of the compartments 10 are anchored to the ground 11 with rods 19 placed within the anchor 15 (FIG. 1B). Typically, the anchors 15 are placed deep in the ground and secured. In any case, the anchors 15 are buried much deeper, preferably having a depth 17 at least one to two feet deeper into the ground, than the compartments 10. The anchors 15 are secured into a concrete or metal base or into the ground with steel rods 19 or in any other way known in the art.

FIG. 2A shows a roller 22 mounted in the interior cavity 16 of the channel 14 of the storage compartment 10. The roller 22 extends throughout of the full length of channel 14. A long sheath 24 of a fire resistant insulation, as described further herein, is wound around roller 22, with one end 26 attached to the roller 22 and with the other distal end 30 securely attached to a mounting mechanism 34 wherein the mounting mechanism is a frame, frame linkage, servomotor or any other suitable mechanism. Alternatively, as seen in FIG. 2B, the sheath 24 of fire-resistant insulation is folded in the interior cavity 16 of channel 14, with one end 26 attached to the bottom 28 of channel 14 and with the other distal end 30 securely attached to a mounting mechanism 34. In operation, as described further below, the distal end 30 of sheath 24 is unrolled or unfolded from channel 14 and sheath 24 is raised by the mounting mechanism 34 to form a protective barrier around house 12. In a non-deployed state, the storage compartments 10, seen in FIG. 2A and FIG. 2B, buried and hidden underground 13, are covered on the ground level 11 with a removable cover 18. The cover 18 may be made of a plastic, wood, sod, glass or any other appropriate material and it may be plain or ornamental.

FIG. 3A and FIG. 3B show the different embodiments and layouts of the storage compartments 10 for fire-resistant insulation 24. As seen in FIG. 3A, the storage compartment 10 for fire-resistant insulation may be conveniently positioned on two facing sides of the house structure or object and the insulation may be deployed from the both sides and connected and secured at a joint point (not shown). Alternatively, the compartments may be positioned on both sides of the house structure, as seen in FIG. 3B, but only one of the compartments actually stores the fire-resistant insulation 24 and is the storage compartment 10 from which is such insulation deployed toward the second anchoring compartment 20. The anchoring compartment 20 contains solely the anchoring means for attachment of the deployed insulation 24 from the compartment 10. The insulation 24 is secured at the ends 32 of the storage compartments 10 and may be deployed with the mounting mechanism 34, as described previously.

FIG. 3A and FIG. 3B additionally show a mechanical mounting means positioned within the compartment 10. The mechanical mounting means, in this instance a raising mechanism 34, is positioned at the ends 32 of the compartment 10, where the raising mounting mechanism is deployed to raise the insulation sheaths 24 of fire-resistant material to form the protective barrier that covers the house or structure to be fire-protected. For deployment, the distal ends 30 of sheaths 24 attached to the raising mechanism 34 are raised using the raising mechanism 34 and extend up and over the house 12, thereby providing the fire-protective barrier. The raised distal ends of sheaths 24 are raised into a proper position and either joined together (FIG. 3A) or secured into the anchoring compartment 20 (FIG. 3B). Side insulations 40, seen in FIG. 5, would be also stored and deployed as described.

Figure 4:
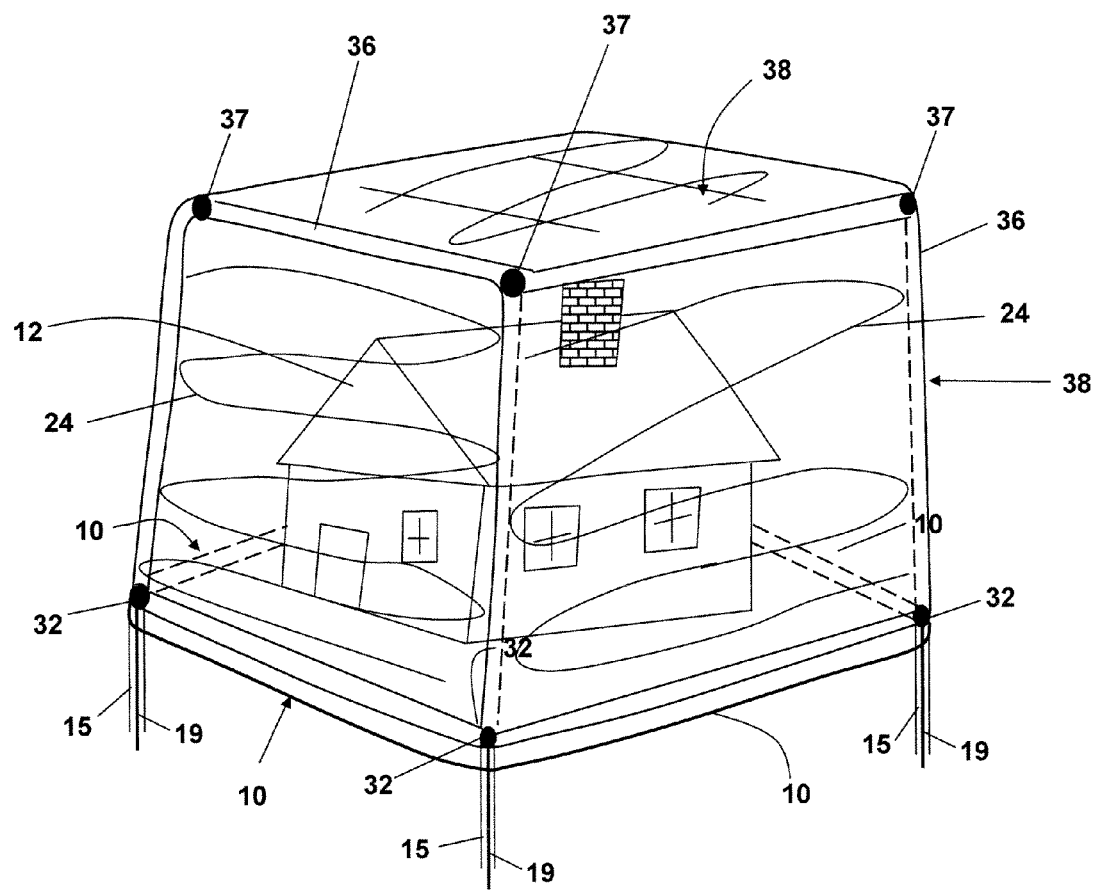
FIG. 4 shows an alternative embodiment for protection of a house structure, wherein in case of a fire, a fire-resistant insulation further comprises a supporting frame that is mechanically or manually erected as a box surrounding the house structure wherein the storage compartments are positioned on four sides of the house and underground and wherein said fire-resistant insulation and said frame are stored in said underground storage compartments.

FIG. 4 shows an alternative embodiment for protection of a house structure, wherein the storage compartments 10 are placed on all four sides of the house 12 and wherein, before deployment, the insulation 24 is stored in the underground storage compartments 10, as described above. Ends 32 of the storage compartments 10 harbor the deployable and erectable frame 36. In case of fire, the frame 36 comprising the attached insulation 24 is mechanically or manually deployed and erected from the compartment end 32 together with said attached insulation and joined together at joint points 37 as a surrounding impermeable fire-protective barrier box 38. After deployment of the insulation 24 from the compartments 10 on all four sides of the house 12, the insulation is joined at joint points 37 into the frame 36 erected from the ends 32 of the compartments 10 around the whole house thereby forming the protective barrier 38. The compartments 10 are anchored with four anchors 15 buried deep into the ground and secured with rods 19. The protective barrier 38 is impermeably secured to the ground and into the frame 36 such that there is no opening for the air, fire or smoke to enter the protective barrier. If the two-ply inflatable insulation is used, the insulation may further be modified such that upon deflation, one ply will tightly cover the house 12 further protecting said house from high temperatures and flames destruction while the second exterior ply will stay attached to the frame 36.

Figure 5:
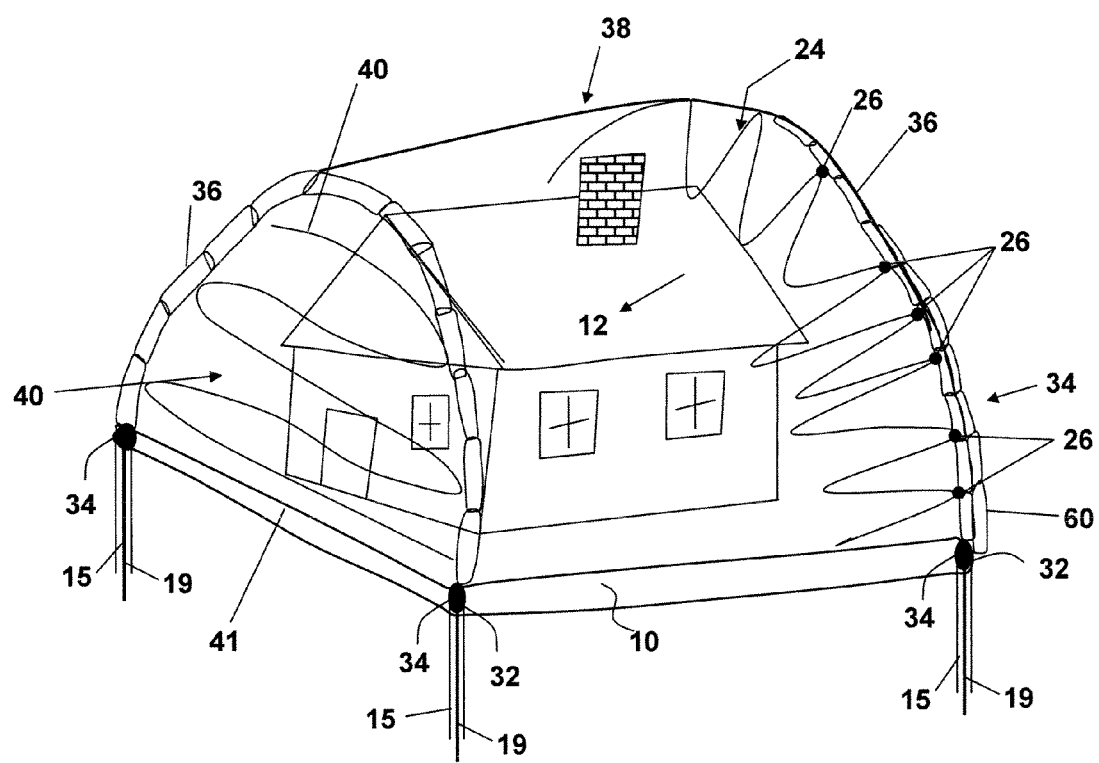
FIG. 5 shows another alternative embodiment for protection of a house structure, wherein in case of fire, a fire-resistant insulation is mechanically or manually erected as an arcuate curved tent frame surrounding the house structure, wherein underground storage compartments are positioned on all four sides of the house and said fire-resistant insulation and said frame are stored in said underground storage compartments. The insulation may be one-ply or two-ply or two-ply inflatable blanket or sheet that during deployment is inflated over the house and takes on the shape of the house during deflating thereby providing a tight insulation cover.

FIG. 5 illustrates another embodiment for the deployment of the fire-protective barrier 38 of the invention wherein the protective barrier of the invention may be half cylindrical. This configuration may be implemented by using the two opposing storage compartments 10 of FIG. 3A or FIG. 3B in which a portion of frame 36 extends from each of the two opposed compartments 10 and meet and are coupled at the top. Alternatively, this configuration can be implemented using the one storage compartment system of FIG. 3B in which the frame 36 extends from storage compartment 10 on one side to anchoring compartment 20 (not shown) on the opposite side. In this embodiment, one end of each frame 36 and sheath 24 is anchored in storage compartment 10, and the deployed ends of frames 36 and the leading edge of sheath 24 will be anchored upon deployment at anchoring compartment 20 to form a tight enclosure around house 12. Raising mechanism 34 is shown as a fully extended frame 36 to which the edges 26 of sheath 24 are attached along the sheath's length to the frame 36 to form the fire-protective barrier 38 around the house 12. In the embodiment shown in FIG. 5, the protective barrier 38 has the form of a half cylinder or Quonset hut. A pair of frames 36 extends from ends 32 of storage compartments 10 with sheath 24 extending between frames 36 and attached thereto as attachments 26 to individual frame sections (linkages) of tubes 52-58, seen in FIG. 7B, to form the lateral surface of protective barrier 38. Also seen are side-insulation sheets 40 and attachments of side insulation sheets 41. The side sheaths 40 made of the same or similar fire resistant insulation material are also mounted to the frames 36 to complete the protective barrier 38. The storage compartments and by extension during deployment also the fire-protective barrier, are anchored using anchoring 15. To complete protective barrier 38, end sheaths 40 similarly extend from additional storage compartments 10 along the end of the half cylinders, as shown in FIG. 1. Side insulation sheaths 40 are also attached to frames 36, or alternatively to additional frames that are adjacent to frames 36. As in all previous configurations, the Quonset hut is anchored with anchors 15 and secured with rods 19.

Figure 6A:
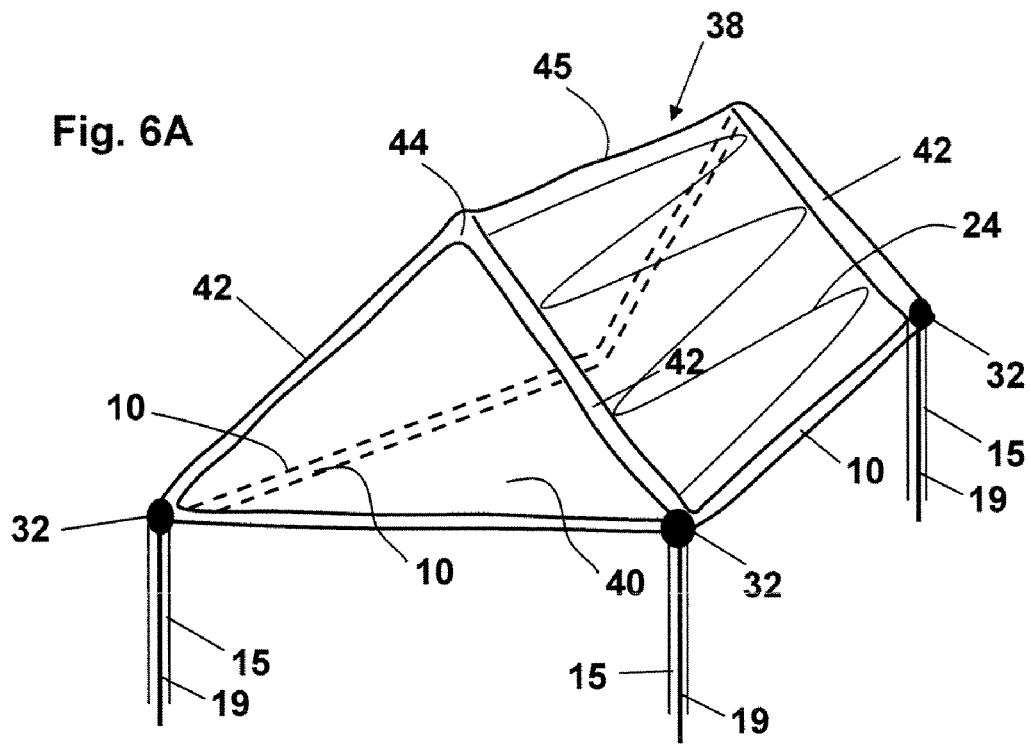
FIG. 6 shows other alternative embodiments for protection of a house structure, wherein in case of a fire, a fire-resistant insulation is mechanically or manually erected as a linear tent (FIG. 6A) or as a pyramid shaped tent (FIG. 6B) having a supporting frame surrounding the house structure wherein the storage compartments are positioned on four sides of the house and said fire-resistant insulation and said frame are stored in the underground storage compartments and wherein the top of the frame has a locking means for securing four frame sections together.
Figure 6B:
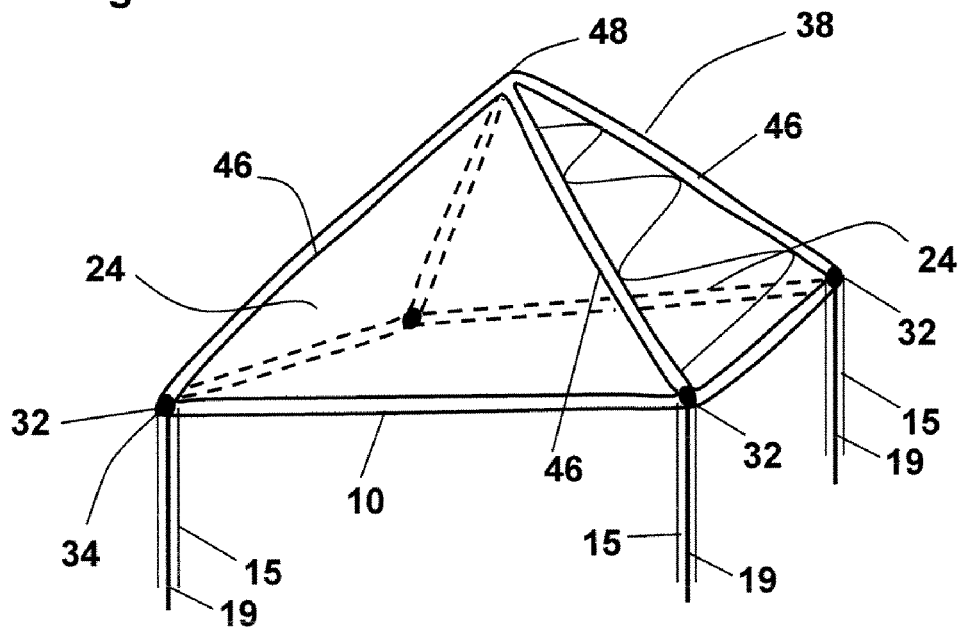

In addition to the Quonset but shape, other configurations of the protective barrier can be also advantageously utilized, as illustrated in FIG. 6A and FIG. 6B. In FIG. 6A, fire-protective barrier 38 has a tent shape. In this configuration, support frames 42 are linear instead of curved as frames 36 seen in FIG. 5. Frames 42 are formed by segments (FIG. 7A and FIG. 7B) that extend from opposed compartments 10 and meet and are coupled at the apex 44. Again, sheath 24 is mounted between frames 42 to form the lateral sides of the fire-protective barrier 38, and side sheaths 40 enclose the sides of the tent. Sheath 24 may be formed of two segments, one from each opposed compartment 10, that meet at the top 45 and are joined together, similarly to the configuration seen in FIG. 3A. A single sheath 24 may also alternatively extend up one side of frame 42 and down the other side where it is attached at the bottom to the anchoring compartment 20 (not shown), similarly to the configuration seen in FIG. 3B. A pyramid shaped barrier 38 is shown in FIG. 6B in which four linear frames 46 extend up and join at apex 48, with sheaths 24 of the fire resistant insulation attached thereto and deployed from the storage compartments 10 to form the four sides of the pyramid. Both configurations are anchored with anchors 15, as previously described. In general, barriers of various shapes can be produced, depending on the configuration of the support frame and the manner of attachment of the sheath of fire-protective insulation. All variations and combinations of shapes, configurations and functionalities described herein are intended to be within the scope of this invention.

One particular embodiment of the support frame that would be used in configuration seen in FIG. 5, and manner of attachment of the sheath 24, is illustrated in FIG. 7A, FIG. 7B and FIG. 7C. The support frame 50, seen herein in detail in collapsed non-extended (FIG. 7A) and extended (FIG. 7B) form, comprises a plurality, with only four shown herein, of nested telescoping tube segments 52, 54, 56, 58. It is to be understood that the number of these segments may be unlimited and there may be as many as needed to provide a firm support for the deployment of the fire-protective barrier. In FIG. 7A, support frame 50 is collapsed for storage, while in FIG. 7B support frame 50 is extended during deployment of the fire-protective barrier. Nested telescoping tubes 52-58 are slidingly engaged together with a suitable mechanism 62, e.g. small servomotors, mounted within the tubes to allow the tubes to be extended or retracted. The tubes may be straight or curved with constant radius, as shown in FIG. 7A and FIG. 7B, form a curved (half circle) frame as seen in FIG. 5, or may be straight to form a linear frame as shown in FIG. 6A and FIG. 6B.

To form the protective barrier of the invention, the sheath 24 must be attached to the frame along its edges. One way of achieving this is to provide an aligned gap 60 along each tube 52, 54, 56, 58 to form a single continuous gap along the length of the extended frame. The distal end 30 of sheath 24 is attached to the tip of innermost tube 52 and the edge of sheath 24 engages the gap 60 so that as each tube is extended, the sheath 24 can slide along gap 60 and remain impermeably attached to frame 50. This operation is illustrated in FIG. 7C which is a side view of the retracted support frame 50 showing nested tubes 52 and 54 with gaps 60. Sheath 24 has a connector segment 62 that extends through gap 60 to the interior of tubes 52, 54. Connector segment 62 has an expanded edge portion 64 that is wider than gap 60 so the sheath 24 remains attached to frame 50 as the tubes 52 and 54 are extended. One end of sheath 24 is fixedly and impermeably attached to inner tube 52. As inner tube 52 extends outward from tube 54, it pulls sheath 24 along. Sheath 24 slides along gap 60, with expanded edge portion 64 keeping sheath 24 slidingly attached to the tubes. This continues as tube 54 is then extended from the next tube, and so on until all the tubes have been fully extended and the sheath 24 is stretched along the whole length of the frame 50 formed by the extended tubes.

Figure 8A:
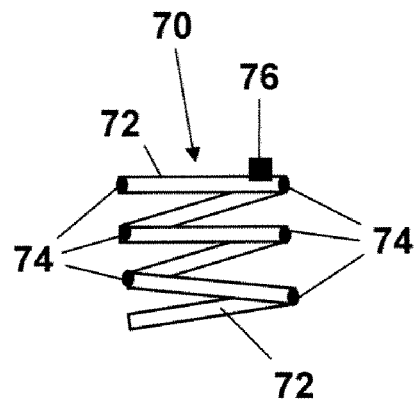
FIG. 8A shows the supporting frame formed of a plurality of foldable linkages in a folded state for storage and further showing points of attachment wherein a fire-resistant insulation sheath is attached to the supporting frame.
Figure 8B:
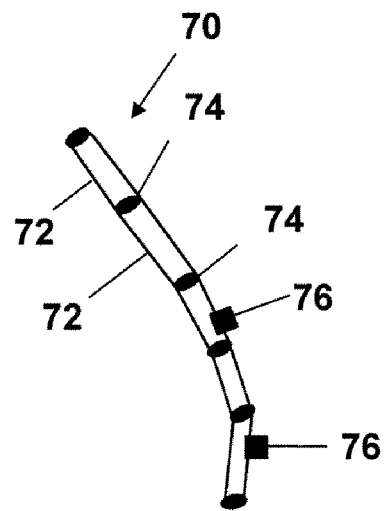

Another embodiment of a frame structure and sheath attachment that can be used to implement the invention is shown in FIGS. 8A-8D. As shown in FIG. 8A and FIG. 8B, frame 70 is formed of a plurality of foldable linkages 72 which are rotatably connected by pivots 74. Suitable mechanisms 76, e.g. servomotors, are attached to the foldable linkages 72, to fold and unfold the linkages for storage and for erecting the protective barrier are shown in detail in FIG. 8C. Since each pivot is independently controlled, frame 70 may take any desired shape, from straight to curved. The curved frame may take any shape, e.g. parabolic, and not just the semicircular shape of frame 50 formed with the nested telescoping tubes. Frame 70 may be formed of two segments which meet at the top or may be a single frame that extends from one side down to the other side of the house, as already described.

Figure 8C:
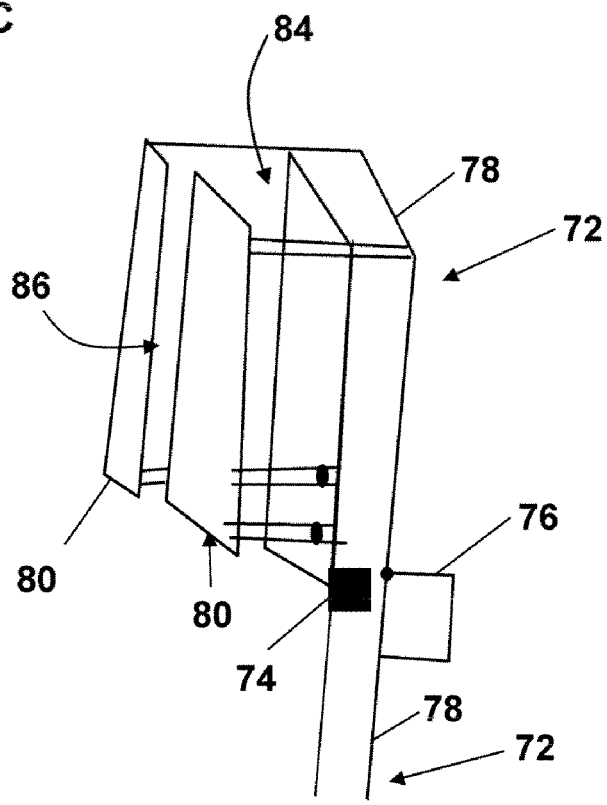
Figure 8D:
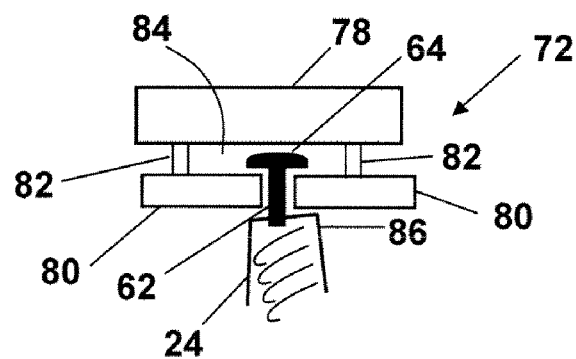
FIG. 8D shows a detailed point of attachment of the insulation to the linkage of the frame.

FIG. 8C and FIG. 8D show foldable linkages 72 of FIG. 8A and FIG. 8B in greater detail. Each linkage 72 is formed of a base plate 78. Successive base plates 78 are rotatably linked together by pivot pin 74, and actuated by drive mechanism 76, e.g. a servomotor, in order to fold and unfold. Pair of spaced parallel plates 80 are attached in a spaced relationship to base plate 78 by mount 82 so that there is a gap 84 between plates 80 and base plate 78 and a gap 86 between plates 80. The gaps 84, 86 allow the sheath 24 to be slidingly engaged along its edge to frame 70. Gaps 84, 86 along each successive linkage 72 form a single continuous gap along the length of the extended frame. The distal end 30 of sheath 24 is attached to the tip of first linkage 72 and the edge of sheath 24 engages the gap 86 so that the sheath 24 is attached to frame 70 along its entire length. Sheath 24 has a connector segment 62 that extends through gap 86 to the gap 84. Connector segment 62 has an expanded edge portion 64 that is wider than gap 86 so the sheath 24 remains attached to frame 70 as linkages 72 are folded and unfolded. One end of sheath 24 is fixedly attached to the first linkage 70. When the mechanism is assembled, sheath 24 is pulled through the entire length of frame 70, with extended edge portion 64 engaged in the gap 84, and the distal end 30 is attached to the tip of the end linkage 70. The entire frame with attached sheath 24 can then be folded for storage. In operation, frame 70 is unfolded by operation of drive mechanism 76, with sheath 24 stretched between and attached to two frames so that a protective barrier is formed.

Figure 9A:
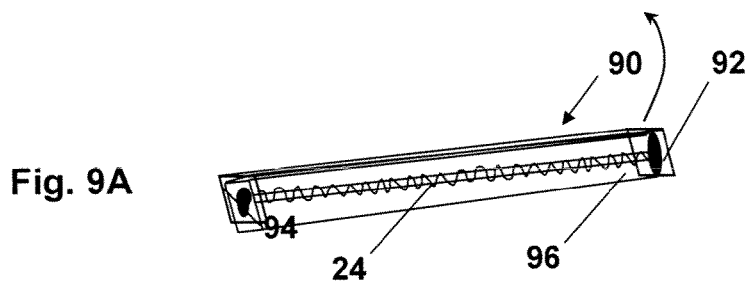
FIG. 9A shows a folded frame stored horizontally in a storage compartment.
Figure 9B:
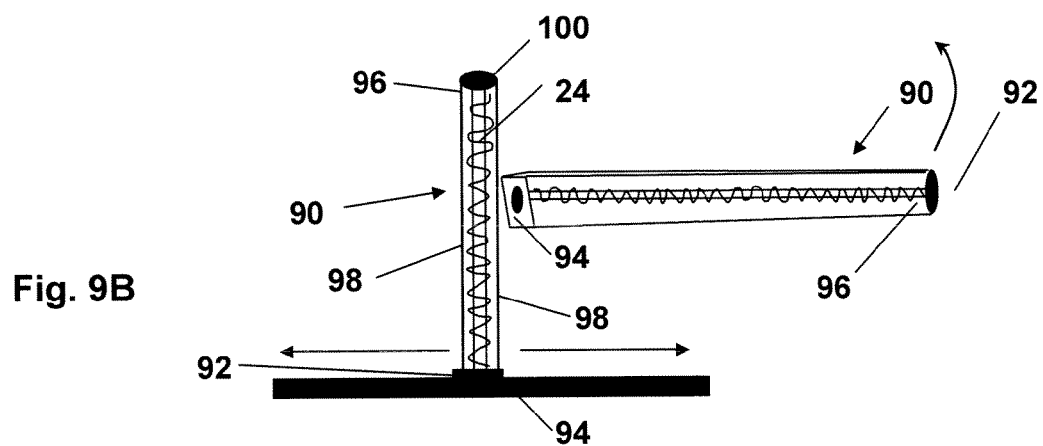
FIG. 9B shows said horizontally stored frame in an unfolding operation wherein the distal end of the folded frame begins to rise to a vertical position for deployment. The embodiment shown in FIG. 9C illustrates a complete deployment of the supporting frame for a tent shaped fire-protective structure shown in FIG. 6A or FIG. 6B.
Figure 9C:
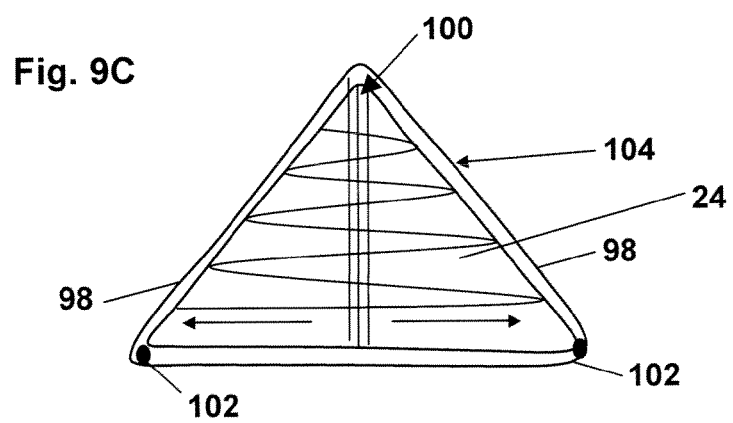
FIG. 9 shows an alternative system for deploying a supporting frame with attached fire-resistant insulation sheaths.

An alternate system for deploying as frame with attached sheath is shown in FIG. 9A, FIG. 9B and FIG. 9C. In FIG. 9A, a folded frame 90 is stored horizontally in a storage compartment 92. Folded frame 90 is rotatably mounted on a base 94. In operation, the distal end 96 of folded frame 90 begins to rise and base 94 moves toward the center of storage compartment 92 until folded frame 90 is vertical, as shown in FIG. 9B. Folded frame 90 is formed of a pair of frame members 98 which are pivotably connected at distal end 96 of folded frame 90 by pivot pin 100. A sheath 24 of fire resistant material is attached on opposed edges to a corresponding frame member 98 and folded up therebetween. Base 94 is formed of two base members 102, each of which has one frame member 98 pivotably mounted thereto. To complete deployment, the two base members 102 move towards respective ends of storage compartment 92, carrying the bottom of each frame member with them while the tops remain pivotably attached, as shown in FIG. 9C. The result is a deployed frame 104 with sheath 24 stretched between and attached along frame members 98. This particular configuration is particularly useful for deploying a tent shaped protective barrier as shown in FIG. 6A.

The invention can be implemented with any frame and attachment that allows the sheath 24 to be positioned to form a protective barrier. Most preferred are fully automated mechanisms. However, manual operation may also be performed. In some cases, part of the frame may be automatically deployed, and other parts of the protective barrier may be manually attached. For example, the lateral surface of the protective barrier 38 of FIG. 5 may be deployed by automatic deployment of the frames 36 with attached sheath 24, and the end sheaths 40 could be manually attached, e.g. by snapping on to frame 36.

One or two-ply fire-resistant insulation may be permanently built into and stored in a compartment surrounding a perimeter of a structure or object to be protected from the fire and may be impermeably attached to a metal support frame able to withstand wind or a gusts of wind having a speed of up to 150 miles/hour. The fire-resistant insulation may be erected or otherwise attached to or around the structure or object to be fire-protected in case of the fire.

These and other arrangements and variations may be conveniently designed to meet the requirement of the invention and are all intended to be encompassed within the scope of this invention.

D. Fire-Resistant Insulation

The fire-resistant insulation of the invention is essentially a composite comprising one or preferably a plurality of layers of the same or different materials constructed into a multi-layer covering, such as a blanket or sheath, wherein each layer may have the same or different thermo-resistant properties and function. In rare instances, the insulation may only have one layer constructed into a sheath.

Essentially, the fire-resistant insulation has a capability to withstand high temperatures above 1200° C. and up to 2000° C., typically from at least about 1450° C. to about 1650° C. and may provide protection against fires reaching up to about 2000° C. temperatures for periods of time exceeding 15 minutes and lasting up to at least 24 hours and preferably 48 hours or more.

The insulation of the invention typically comprises of total three layers. Two layers positioned on two opposite sides of the insulation, namely an exterior layer and an interior layer, are interspaced with an intermediate layer comprising a plurality of sheets of various materials. The exterior, intermediate and interior layers may be made of the same or different materials. Each of the insulation layers may further consist of several layers of the same or different materials and the number of layers. Properties of the materials used for exterior, interior and intermediate layers determine an overall fire-resistance and other properties of the insulation.

A fire-resistant insulation is a one-ply composite blanket or sheath or two-ply sheaths or blankets or two-ply sheet and blanket wherein each ply is made of one or a plurality of layers of the same or different materials having a different thermo-insulating capacity, wherein said materials may be flat or may have a honeycomb pattern and wherein said layers are organized in descending order vis-à-vis thermal resistance from the exterior layer having the highest temperature resistance, highest reflectivity and lowest emissivity.

The insulation, whether a blanket or sheath, is lightweight, durable, flexible and has thickness between about 0.1 and about 5 cm. Preferably, the insulation has thickness between about 0.5 and about 2.5 cm and most preferably not exceeding from about 1 to about 1.5 cm. Each insulation layer is relatively thin having the thickness from about 0.0001 to about 0.5 cm, preferably between 0.005 and 0.25 cm, and most preferably not more than 0.01-0.15 cm. The thickness of the insulation varies between blankets that have generally more layers and thickness between 0.2 and 5 cm, and sheaths that have generally only 1 to 5 layers and thickness between 0.01 and 1 cm.

The insulation is sufficiently flexible to be able to be rolled into a storage roll or stored as a folded and extendible accordion, and easily and quickly unrolled and erected over the structure or object to be protected.

Generally, the insulation is composed of at least of the exterior and interior layers, and may optionally contain an intermediate layer comprised generally of from 2-50 sheets of the alternating honeycomb sheets and the flat sheets. For example, the build-into house permanent insulation may have up to 50 or even more layers, since the weight will not likely be that important. On the other hand, for a portable temporary insulation where the weight is important there will be a lower number, typically less than ten, layers because the weight of the insulation would be critical for fast transportation and deployment.

1. Multi-Layer Fire-Resistant Insulation

In one embodiment, the fire-resistant insulation is a multi-layer blanket or sheath that consists of exterior and/or interior and/or intermediate layers, wherein said layers are fabricated from the same or different material and may have the same number or different number of layers.

a. Exterior Layer

The exterior layer is positioned at an outermost exterior side of the insulation that covers said structure or object and is capable of withstanding temperature of up to 2000° C.

Typically, the insulation comprises an exterior layer that may be made of fire-resistant woven fabric, such as for example silicon carbide having an interlock design or single or double aluminized polyamide. The polyamide film may be flat or have a honeycomb pattern.

A woven fabric, which is a preferred material for the exterior layer, may comprise sheets of silicon carbide fill yarns stacked over each other where the silicon carbide fill yarn sheets can be interwoven with another silicon carbide fill yarn sheets in an interlock pattern by a warp yarn. In this way, the woven fabric may consists of more interlocked sheets of silicon carbide fill yarn sheets thereby providing a low emissivity, high reflectivity and high heat resistant exterior layer.

The woven fabric made of silicon carbide yarn is commercially available and typically has 600 denier, 200 filaments per tow with a fabric yarn count from 35 to 40 per cm for warp and 33 to 36 counts per cm for fill. Exemplary silicon carbide yarn is Fiber FP® available from DuPont company, Nextel® available from 3M Company and Nicalon® available from the Nippon Carbon Company of Japan. These fibers are uniquely suitable for reinforcement of resin, metal, and ceramic matrix composites.

The weight of the woven fabric is typically from 100 to 500 grams per square meter and the thickness of the fabric approximately 0.1 cm.

b. Interior Layer

The interior layer is positioned at an innermost side of the insulation that covers a structure or object covered with the fire-resistant insulation and provides a fire-protection for said structure or object.

The interior layer is typically a thin layer of one or two-sided aluminized foils but it can also be a silicon carbide fabric. In case of fire having high temperatures above 1200° C. reaching the exterior layer, said structure or object is subjected preferably only to temperatures of about 120° C. (248° F.) and not exceeding about 300° C. (572° F.). This feature is very important for protection of the content of the house against destruction by heat generated from the fire. The interior layer thus form the actual barrier not only protecting the house structure or object from being burned down but also from the destruction of the content of the house due to the high heat generated by the fire.

In one embodiment, when the fire-protective insulation is two-ply inflatable insulation having a cavity between the exterior and interior layer, the insulation may be inflated during deployment of the fire-protective barrier and subsequently deflated so that the interior insulation falls on the house or structure and the cavity between the exterior and interior ply are again inflated thereby forming the tight association of the interior ply with the house structure or object and essentially taking on the shape of the fire-protected structure whereas the exterior ply remain deployed as the fire-protective barrier with both firmly anchored in the ground.

c. Intermediate Layers

Intermediate layers are positioned between the exterior layer and interior layer. Their main function is to provide a thermo-resistant gradient of the insulation from exterior layer providing resistance to high temperatures generated by the fire to the interior layer providing a protection against destruction by heat. The thermo-resistant gradient is therefore somewhere between 1200° C. and 2000° C. on the exterior and 120° C. and 300° C. It is to be understood that the exterior temperatures of the fire may be lower than 1200° C. and that such situations are not excluded from this invention.

Typically, intermediate layers are sheets of materials comprising an aluminum foil or aluminum deposited on film sheet, such as polyimide film sheets, metallic film on polymeric substrate, a firm open-weave fabrics, such as aluminoborosilicate scrim, aluminoborosilicate felt, aluminoborosilicate polyimide film, scrim fabric containing aluminoborosilicate, scrim fabric containing silica, felt containing silica, felt containing alumina, felt containing aluminoborosilicate, polyimide film, poly(vinyl fluoride) film, poly(ether ketone) film, aluminum foil, polyimide film containing gold, polyimide film containing aluminum, mat containing silica or mat containing aluminoborosilicate.

One embodiment of the intermediate layer is a stack of polyimide films aluminized on one or both sides having a honeycomb pattern. There may be from about five to about hundred, preferably from about nine to thirty, such honeycomb sheets in one intermediate layer. Some or all of the layers may also be prepared as flat sheets or foils and both honeycomb and flat sheets types may be combined in alternating or random manner. The honeycomb patterned materials and/or foils may be fabricated into a three-dimensional honeycomb structure by itself and used as a separate intermediate layer or they may be conveniently attached to the exterior and interior layers.

d. Thermo-Resistant Gradient of the Fire-Resistant Insulation

The fire-protective insulation has a thermo-resistant gradient between its exterior and interior layer.

Because each of the three layers has a different thermo-resistance, the whole insulation cumulatively results in the thermal gradient from about 2000° C. on the exterior side of the insulation to the maximum of 300° C., and preferably about 120° C., on the interior side of the insulation. Thus the exterior side of the insulation is fabricated from a layer of material able to withstand temperatures of up to 2000° C., typically at least 1600° C., for extended time period of several hours or days. Temperature reaching the protected structure will depend on the emissivity and reflectivity of the exterior, intermediate and interior layers, cumulatively. It needs to be such that the interior side of the insulation that protects the covered structure and provides a barrier for temperature will not exceed 300° C. and preferably it will not exceed 120° C., on the external side of the fire-resistant structure. The fire-resistant structures are either made or built of such insulation, or comprise such insulation or are covered with such insulation.

Exemplary insulations disclosed in the U.S. Pat. No. 5,038,693, issued on Aug. 13, 1991, and U.S. Pat. No. 5,277,959, issued on Jan. 11, 1994, all herein incorporated by reference in their entirety, may be advantageously used in practice of the invention and would provide a suitable fire-resistant insulation or a portion thereof. These materials have been designed and used for protection of spacecraft and are therefore very durable and able withstand the high temperatures for long periods of time.

e. Configuration of the Insulation

The fire-protective insulation of the invention is typically of two types. One type is a multilayer blanket comprising at least exterior and interior layers and, preferably, also the intermediary layers, as described above. The second type of the insulation is a sheath that may consist of all three layers with fewer sheets or it may comprise only one or several, typically two to five, sheets of the same or different material fabricated into the sheath.

1. Blanket Insulation

Figure 10A:
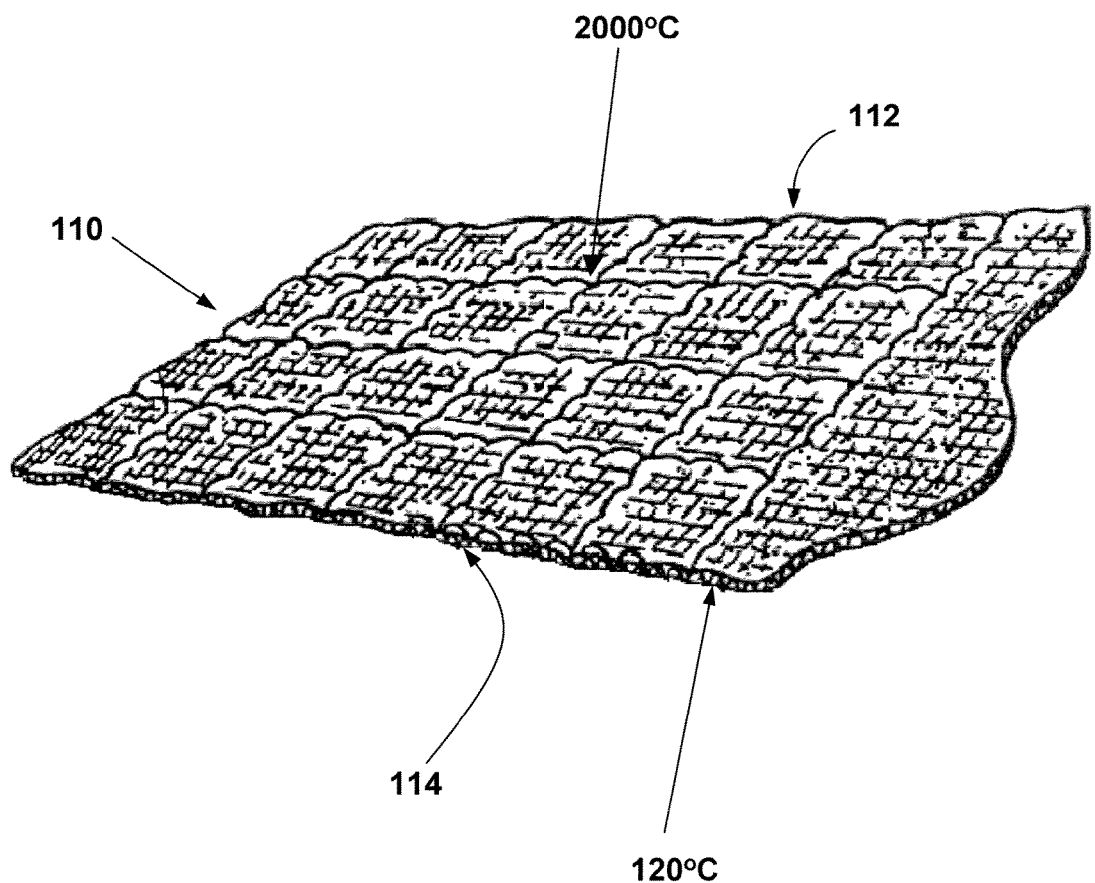
FIG. 10A shows a fire-resistant insulation comprising a one-ply blanket having an exterior and interior side.
Figure 10B:
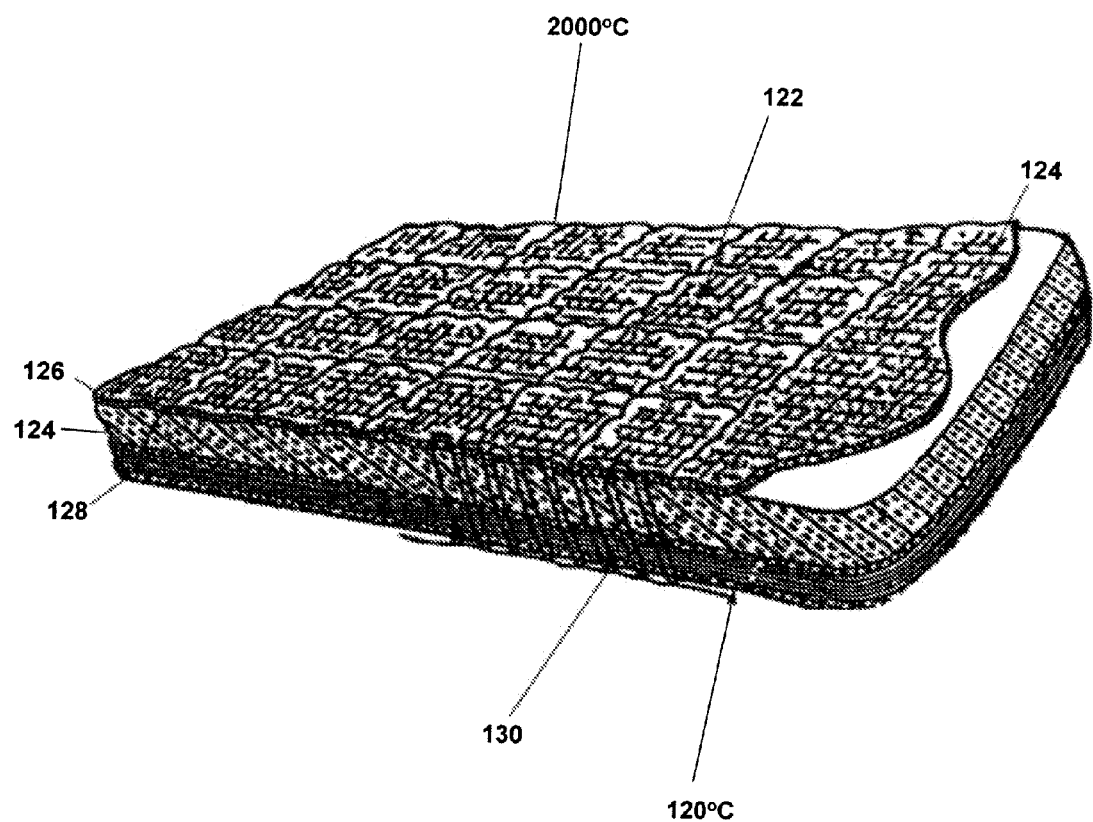
FIG. 10B shows a fire-resistant insulation comprising a plurality of layers secured together with thread to form a composite insulation comprising exterior, intermediary and interior layers having a thermal gradient from 2000° C. to 120° C.

The blanket insulation seen in FIG. 10B is a multilayered flexible composite 122 that typically consists of the exterior layer 126, intermediate layer(s) 124 and the interior layer 128. In some embodiments, the blanket may also consist only of the exterior and interior layer. Example of the blanket configuration is seen in FIG. 10B. On the exterior side, the blanket is able to withstand temperatures up to 2000° C., whereas on the interior side, the blanket is reaching and allows permeation of temperature of at most 300° C. and preferably only 120° C.

The exterior layer 126 is typically made of a woven fabric. The woven fabric typically consists of stacked layers of silicon carbide fill yarn interwoven with another silicon carbide fill yarn layer in an interlock pattern by a warp yarn. The woven fabric consists of at least three interlocked layers of silicon carbide fill yarn, about 600 denier, about 200 filaments per tow, with the yarn count from about 35 to 40 per cm for warp and 33 to 36 per cm for fill.

The intermediate layer 124 is typically fabricated of a plurality of layers comprising either flat sheets, sheets having a honeycomb pattern or a combination of flat and honeycomb sheets. The sheets may be stacked one over another, such as several layers of the flat sheets, several layers of honeycomb sheets or they may be intertwined with one flat sheet, one honeycomb sheet and again one flat sheet and one honeycomb, etc. Any combination of stacking the intermediary sheet is intended to be within the scope of this invention.

The honeycomb pattern sheets are typically made of an aluminum foil or vacuum deposited aluminum or gold on polyimide film deposited on one side or on both sides of the polyimide film. There are typically between three and thirty flat or honeycomb pattern sheets in the intermediate layer. Preferably, the intermediate layer is made of five to twenty sheets of silica, aluminoborosilicate or alumina and the layer comprises at least some layer having the honeycomb pattern.

The interior layer 128 of the blanket is typically made of low emissivity, high reflectivity material that will provide a last barrier before the heat reaches the protected structure.

Such material is typically flat and may be aluminized film or silicon carbide fabric.

All three layers are attached together using any suitable means of attachment. FIG. 10B shows the use of a ceramic thread 130 as a means of attachment.

The fire-resistant blanket insulation provides substantial decrease in temperature observed on the interior layer side, that is on the backside, of the insulation facing the structure to be protected. This is partly due to an interlock silicon carbide fabric used for the exterior layer, that is the outer surface of the insulation, as well as due to use of aluminized foil and the honeycomb pattern foil used for intermediate layer and low emissivity interior layer. Generally, the blanket would be more suitable for build-in permanent fire-protection.

2. Sheath Insulation

Sheath insulation 110 seen in FIG. 10A typically consists of one to about five layers of flat sheets of material joined together to form a thin sheath having thickness between about 0.1 to about 1 cm, preferably from about 0.1 to 0.5 cm. Sheath 110 may also have one or two honeycomb pattern sheets placed between the flat sheets. The sheath typically comprises of one or several thin sheets of material. If the sheath insulation comprises of one sheet, the sheet will typically have two sides 112 and 114, each side having different thermo-resistant properties. Emissivity and reflectivity of the material on the exterior side 112 and on the interior side 114 is very important due to the thinness of the sheath insulation. The sheet insulation has a thermo-protective properties similar to the blanket wherein on the exterior side 112 the sheath withstands temperature above 1200° C. and up to 2000° C. and on the interior side 114 protects the structure or object from temperatures reaching above 300° and preferably above 120° C. The material used for the one layer sheath may be a film covered with a different material on each side, such as for example aluminized film on one side and silicon layer on the other side. Sheath comprising several sheets may be fabricated from materials such as aluminized foil or film stacked over each other and fixed together with sewing or pressing to provide a fire-resistant sheath. Example of the sheath configuration is seen in FIG. 10A.

The sheath itself may be used as the fire-resistant insulation or it may be used as an exterior but preferably as an interior layer in a two-ply insulation.

3. One-Ply Insulation

A one-ply fire-resistant insulation is a composite that consists of an exterior layer, interior layer and intermediate layers or exterior and interior layers and is basically the insulation blanket, as described above. The exterior layer is on a side facing the fire. The interior layer is facing a structure or object to be protected from fire. The exterior and interior layers are interspaced with plurality of intermediate layers of the same or different materials. The material used for fabrication of exterior, interior or intermediate layers is selected from the group consisting of silica, aluminoborosilicate, silicon carbide or organometallic polymer comprising silicon, organometallic polymer comprising titanium, organometallic polymer comprising carbon, organometallic polymer comprising oxygen, a scrim fabric containing aluminoborosilicate, scrim fabric containing silica, felt containing silica, felt containing alumina, felt containing aluminoborosilicate, polyimide film, poly(vinyl fluoride) film, poly(ether ketone) film, aluminum foil, polyimide film containing gold, polyimide film containing aluminum, mat containing silica and mat containing aluminoborosilicate and any combination thereof.

All three, the exterior, intermediate and interior layers of the blanket may be fabricated from the same, or, preferably, from different sheets of material and each layer may consist of a combination of various materials. Thus, for example, the exterior layer may be fabricated from one material but it may also be a composite of several materials or several sheets of different materials. Likewise, the intermediate layer may be and preferably is fabricated of more than one sheets. Each of the sheets may be flat or have a honeycomb or another pattern. Similarly, the interior layer may be a single sheet, such as a sheet of the material or it may comprise several sheets of different materials.

In one embodiment, the exterior layer of the one-ply blanket is made of an interlock silicon carbide fabric, the interior layer is made of aluminoborosilicate or silica sheets and the intermediate layer may be made of stacked metal honeycomb foil sheets optionally separated by flat foil sheets. There may be between three and fifty alternating sheets in the one-ply insulation. One-ply insulation is shown in FIG. 10B.

4. Two-Ply Insulation

Figure 11:
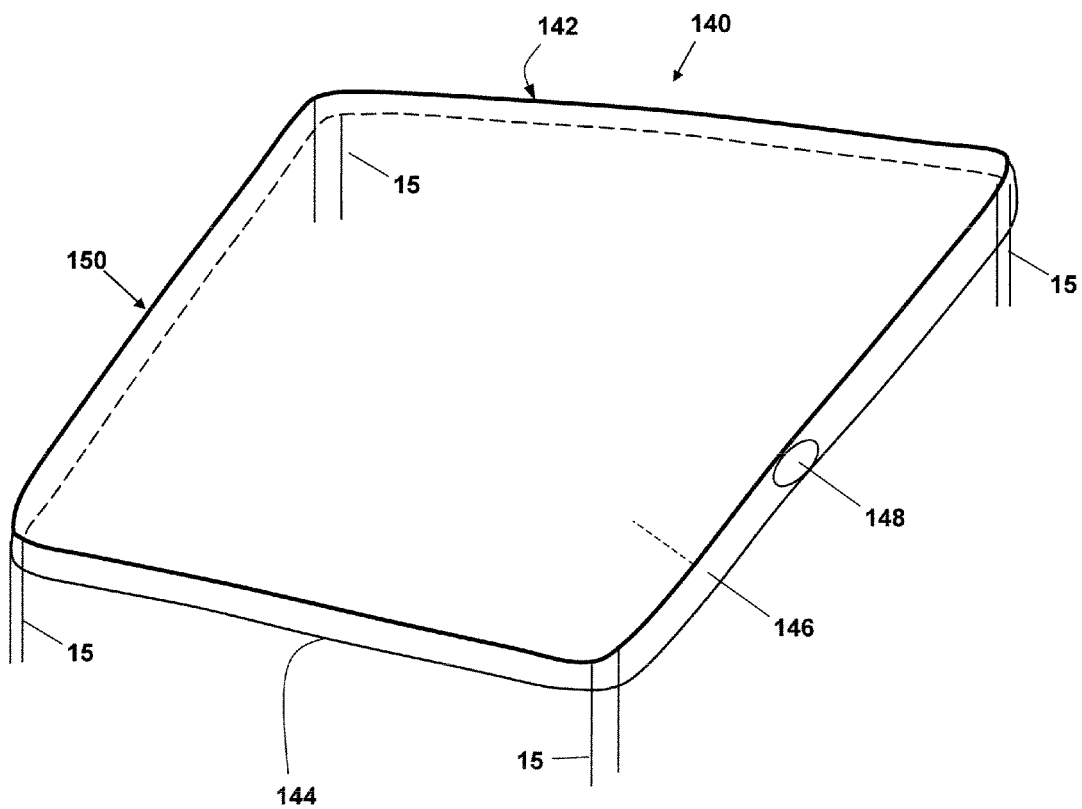
FIG. 11 shows a two-ply inflatable sheath insulation having exterior and interior layers in extended non-deployed state. The insulation could be rolled into a roll or folded into an accordion for easy storing.

A two-ply fire-resistant insulation 140 seen in FIG. 11 comprises of two separate fire-resistant insulations attached together at their circumferential peripheral edges 150 thereby forming an internal inflatable cavity 146 permitting inflating of said cavity into a tent, tent-like or any other shape cover or flat cover for a fire-protection of various structures and objects.

The one or two-ply fire-resistant insulation may further comprise means for inflating 148 or otherwise expanding itself into a field or ground covering. Means of inflating the two-ply insulation are known in the art and may be various valves, valve stems, nipples, connectors, etc.

The two-ply fire-resistant insulation 140 is generally made of two separate fire-resistant insulations 142 and 144 attached together at their circumferential edge 150 thereby forming an internal inflatable cavity 146 permitting inflating of said cavity into a shape of the cover needed for a fire-protection of various structures and objects. After inflating, in one embodiment, the two-ply insulation permits deflating of said cavity thereby providing a tight insulation cover for any structure or object. The tow-ply insulation is anchored with anchors 15, as already described.

Both, one or two-ply thermo-resistant insulation are capable of withstanding temperatures from about 1200° C. and up to about 2000° C.

5. Thickness and Weight of the Insulation

The volume (thickness) and weight of the insulation are very important aspects of the insulation for practicing the invention. Obviously, the insulation needs to be as thin as practically possible and weight as little as possible but still possess the fire-resistant properties. Its weight and volume must allow its deployment, must allow its attachment to the support frames and/or be otherwise practically suitable for in-building into the housing structures.

The blanket insulation of the invention may consist of from about five to about several hundred, preferably from about 5 to about 30, sheets of materials and may have thickness from 0.5 to about 5 cm. The blanket is lightweight with the weight of the woven fabric between 100 and 500 grams per square meter. The preferred thickness of the fabric is between 0.5 to 1 cm, preferably not more than 0.5 cm.

The fire-resistant blanket insulation as seen in FIG. 10A is made of layers of materials stacked in a stack and preferably attached together for example by pressing, melting, gluing or using any other method to hold the individual layers together or quilting the layers together with durable silicon carbide or other ceramic threads able to withstand high temperatures.

III. Materials Suitable for Fire-Resistant Insulation

Suitable materials for fabrication of the fire-resistant insulation are light-weight and durable materials that are either flat or may have a honeycomb pattern. Most suitable materials are silicon carbide fabrics and aluminized foils attached together into a blanket or sheath with yearn and fibers.

A. Materials

1. Silicon Carbide Fabric

One material that may be advantageously used for fabrication of the exterior, interior or intermediate layer is silicon carbide fabric. The silicon carbide fabric is particularly suitable for use as the exterior or interior layer. Particularly preferred is the silicon carbide fabric having a special interlock although the silicon carbide fabrics fabricated in plain or satin weave may also be used. The high density and packing of the interlock silicon carbide fabric results in a cooler surface temperature on both the exterior and interior layer.

The silicon carbide fabric suitable for practicing the current invention is or has generally the same or similar composition as a commercially available SiC-1 fabric also known as NICALON7 type NLM 202, size P, 600 denier, 200 filaments/tow. Fabric yarn count is 37/cm (warp), 34/cm (fill), fabric thickness is 0.01 cm and weave type is interlock 3 ply. The fabric consists of at least 3 sheets which are interlocked. The interlock provides interstructures having a very high density surface. The silicon carbide fabric interlock can be used as the exterior layer of the blanket insulation or as the interior layer, or as both.

The silicon carbide fabric may be manufactured using methods known in the art or obtained commercially from, for example, Polymer Group Inc., North Charleston, S.C. or Fabric Development, Inc., Qusquertown, Pa.

2. Aluminized Film Sheets

The blanket insulation of the invention may further conveniently use aluminized film composed of vacuum deposited aluminum on, for example, 0.0012 cm thick polyamide film. This film may be placed as intervening sheets between the honeycomb and/or foil sheets of the intermediate layer.

The main advantage to use the aluminized film as an exterior layer is that it is light and has high reflectivity and thus provides a kind of a reflective shield for the heat transfer into and through the insulation. At the same time it being light it also provides a substantial weigh savings. The aluminized film weighs approximately 18 g/square meter. The thinnest aluminum foil commercially available is 0.00076 cm thick and weights 20 g/square meter. When combined with a thin ceramic scrim cloth, the total weight is 46 g/square meter. For insulations having a large surface area, such as large insulation for protection of houses and other structures and objects, the weight is very important and thus the weight savings is substantial when applied to the whole area.

Additionally, aluminized polyamide film may be substituted with any high temperature organic film having similar thermal and weight properties, such as, for example, gold or platinum deposited on film. The thickness of the metal deposit on the plastic film should be uniform. Usually it is between about 100 and 3000 microns, preferably about 200 microns in thickness.

High temperature organic films include, for example, KEVLAR7, TEDLAR7 (polyvinyl fluoride), KAPTON7, available from DuPont, Wilmington, Del., or PEEK (polyetherether ketone) from Imperial Chemical Industries, Petrochemical and Plastics Division, Welwyn Garden City, United Kingdom. The metal deposition is accomplished by procedures, such as, for example, chemical vapor deposition (CVD), which are conventional in the art. The metal-deposited high temperature films are commercially available from the film manufacturers.

Another advantage of the aluminized films is that the spectral reflectance of the aluminized foil or chemically vapor-deposited aluminum on polyamide film does not degrade significantly as a function of temperature and time.

B. Fibers and Yarns

Materials suitable for fabrication of multi-layer fire-resistant insulation may be conveniently mounted together into a composite by using a fire-resistant yarns and fibers. Most of these materials are commercially available.

Fibers and yarns suitable for use in manufacture of the fire-resistant insulation or for preparation of interlock pattern fabrics are, for example, zirconia felt or fiber, known under the tradename ZIRCAR7 which retains its fibrous nature at 2480° C., and flexibility at around 1370° C. Ceramic fibers based on organometallic polymers known as TYRANNO FIBER7, yielding a composition of silicon, titanium, carbon and oxygen, maintain fiber strength at 1300° C. Silicon nitride maintains high fiber strength after conditioning for 2 hrs at 1200° C.

All these and other fibers and yarns having the same or similar properties may be conveniently used for practicing this invention.

IV. Configuration of the Insulation

The insulation of the invention may have different configuration depending on the intended use. If the insulation is intended to be in-build into the structure or cover the structure permanently, thicker blanket will be used and mounted, for example, on the exterior wall of the structure. In such a case, the more voluminous honeycomb pattern sheets would be used. On the other hand for temporary insulation that needs to be stored and or transported to the place of fire and be readily deployable, the thin flat sheath insulation will be used as it is lighter and thinner.

A. Flat or Honeycomb Sheets

1. Honeycomb Sheets

Technology for fabrication of the honeycomb materials is known in the art. Generally it involves a layer of open-ended cells prepared from flat, preferably flexible, sheets of thin material perforated with numerous slits made into a pattern resulting in controlled geometry air cells after stretching the foil perpendicularly to the axis of the cells. The manufacture of honeycomb-like materials is disclosed in U.S. Pat. No. 4,550,046, incorporated herein by reference.

The honeycomb sheets suitable for purposes of this invention are flexible and permit use of a wide variety of materials, various cell dimensions and numerous combinations of honeycomb and flat sheets.

The honeycomb-containing blanket insulation may be designed using different types of honeycomb for specific environments. The honeycomb sheets may be produced from highly reflective, highly absorptive or nearly transparent materials. The honeycomb cell dimensions may be designed in such a way that it prevents convection and increases the insulating capacity.

The honeycomb pattern can be produced from many nonwoven materials including polyamide plastic film, metal foil, aluminized foil, Saran7 wrap, Mylar7 film, ceramic metalized papers such as silica or quartz and any other suitable material.

The preferred material for use in this invention is a polyamide foil aluminized or gold plated on one or both sides, or a metal foil made of aluminum or stainless steel. Particularly preferred is the polyimide foil commercially available from DuPont Corporation, Del., as KAPTON7, available in 0.00076 cm thickness, coated on one or both sides with 700 to 1000 angstroms of vacuum-deposited aluminum commercially available from Sheldahl Corporation, Minn. The nonwoven quartz paper is available in a 0.0127 cm thickness from Pallflex Corporation, Denver, Colo.

While the most preferable material for insulation of this invention is a polyimide honeycomb, quartz honeycombs able to withstand temperatures to 1950° C. are equally suitable.

The sheets having a honeycomb pattern have lower thermal diffusivity and conductivity. They do not increase weight of the blanket insulation and thus provide substantial weight savings over conventionally known and used insulations and also improve the durability of the insulation under thermally challenged conditions. The sheets, such as honeycomb foils, stacked together effectively prevent convection and reduce conduction of heat through the insulation toward the interior layer facing a structure or object to be protected.

2. Flat Aluminized Foil Sheets

While the honeycomb sheets are preferable for fabrication of the intermediate layers, a one-side or two-side aluminized foils may also be conveniently used as a stack of plurality of sheaths or, preferably the intermediate layer may be fabricated from both the honeycomb and one-side or two-side aluminized sheets. The one-side aluminized sheets exhibit lower thermal conductivity than the double side aluminized foils.

V. Properties of the Fire-Resistant Insulation

The fire-resistant insulations of the current invention represents a substantial improvement over previously known insulations. They provides flexible, durable, lightweight, high-temperature resistant insulations suitable for repeated use at high temperature exposures. These insulations have various configurations, various temperature resistance, reflectivity and emissivity parameters and possess various properties. By combining fabrics and sewing threads having a resistance to high heat flux and high emissivity, high break strength and a low density, these insulations achieve unexpectedly high fire-protective properties.

The fire-resistant insulations insulation can be designed to have desired thermal insulation capability from above 1200° C. to about 2000° C. and to be, at the same time, lightweight, flexible, durable and have a thickness of only from about 0.1 to about 5 cm.

VI. Manufacturing of the Fire-Resistant Insulation

The fire-resistant insulation suitable for use in the current invention has several requirements. It must be capable of withstanding temperatures above 1200° C. and up to about 2000° C. It must be lightweight and easily manipulated for quick transportation to a place of fire or for permanent attachment to the structures and objects. It must be thin for easy storage. It must be flexible for easy mounting and deployment in case of fire. It must be strong and able to withstand gusts of strong winds. It must be durable and able to be impermeably mounted onto anchoring without breaking, tearing or dislocation from said anchoring. Insulations provided herein have all the above properties and attributes.

During fabrication of the insulation, all or some of the above described sheets of various materials are stacked or placed in layers on each other and quilted, sawn, interlocked, woven, pressed, melted, glued, or otherwise attached or joined together into a sandwich-like structure resulting in a composite cover insulation.

The fire-resistant insulation may be assembled using simple method known in the art and readily available equipment. Honeycomb material, be it polyimide or quartz, may be produced by creating a continuous pattern of staggered perforations in the web using, for example, a matched set of rotary dies. A pattern of slits in the foil allows it to expand if stretched lengthwise, that is perpendicular to the axis of the slits. In this way, the occupied volume may be increased approximately 140%. Once stretched and set in place, the honeycomb structure can be used to create an efficient thermal insulation. The perforated material may then be expanded to form the honeycomb-like structure. Kapton honeycomb is set in place with heat, while quartz honeycomb is set by misting with water. The honeycomb and/or flat sheets are then assembled according to the design of the insulation.

VII. Attachment and Storage of the Fire-Resistant Insulation

The fire-resistant insulation may be attached to a structure or object such that said structure or object is made of said insulation, said insulation is build into said structure or object, said insulation covers said structure or object or such insulation is separate from said structure or object and is used to cover said structure or object in case of fire. Illustrations of these attachments are seen in FIGS. 1-9.

A method for fire-protecting a structure or object comprises steps of making or building said structure or object using a fire-resistant insulation capable of withstanding temperatures up to 2000° C. The insulation may be used alone or in a combination with other structural elements. The insulation may be attached to a fire-resistant structural support. The insulation itself may also comprise a structural support for its erection and deployment. When the fire-protected structure or object comprises fire-resistant insulation, such insulation may be built into walls, roofs, windows or doors of said structure, into grounds surrounding said structure or is built into or attached to said structure as a mechanically or manually releasable component or, in case of the object, it tightly surrounds or covers the object.

VIII. Method for Fire-Protection

A method for fire-protection provides a means for protecting a structure or object, as defined above, from fire destruction or damage.

Typically, even the very hot fires reach temperatures not exceeding about 1600-1650° C. However, during the firestorms, for example, due to a heat flash, the temperature may reach above 1650° C. Consequently, the insulation of the invention that is able to withstand temperatures up to about 2000° C. can protect any structure or object when such insulation is erected around or placed on the exterior side of said structure or object exposed to the fire or a firestorm. On the interior side, that is on the side that covers or protects the structure or object, such as the house or building, the insulation design provides a shield for temperatures no higher than 300° C. and preferably temperatures inside of the structure do not exceed 120B200° C.

The method has essentially two parts. In the first part, the fire-resistant insulation is prepared according to the invention. In the second part, the fire-resistant insulation is used for protection of structures and objects in case of fire. Such protection may be permanently built-into the structure or object making it fire-proof or it may be stored and available as a separate insulation and used for temporary and occasional protection of structures and objects in case of fire.

The fire-resistant blanket or sheath insulation of the current invention provides an improved lightweight insulation which is extremely effective in terms of thermal protection of structures subjected singly or repeatedly to high heat fluxes, such as during brush-fires or fire storms.

While only a few embodiments of the invention have been shown and described herein, it will become apparent to those skilled in the art that various modifications and changes can be made in the lightweight composite flexible blanket insulation and the method of producing the insulation described herein without departing from the spirit and scope of the present invention. There is every reason to believe that the weight and insulation efficiencies cited herein can be further improved upon with minor material modifications. All such modifications and variations are intended to be within the scope the scope of the invention.

EXAMPLE 1

Fabrication of Fire-Resistant Blanket Insulation

This example presents materials and conditions for fabrication of the fire-resistant insulation. The example is exemplary. The disclosed materials may be substituted with other materials as described in the specification and fabrication conditions may be changed as necessary and appropriate for the used materials.

The fire-resistant blanket insulation is fabricated from silica, aluminoborosilicate, silicon carbide or silicon carbide having interlock design.

The insulation is constructed as follows:

Exterior and interior layers are fabricated from the following materials.

Exterior layer: The SiC7 type NLM 202, 15 harness satin weave with sizing type M, yarn count 20/cm (warp)×18/cm (fill), 200 filament 600 denier yarn, yarn construction ½ warp, ½ fill, fabric weight 3.8/m2, obtained from Dow Corning, Midland, Mich., or the SiC7-1 yarn, Nicalon type NLM 202, size P, 600 denier, 200 filaments/tow. Fabric yarn count is 37/cm (warp) ×35/cm (fill), or silicon carbide fabric having an interlock design.

One silica layer, made of fibrous high temperature insulation material obtained from Manville Corp., Denver, Colo. Insulation is Q-Fiber Felt, 2.7 kg/30 cm3 heat cleaned at 540° C. for 2 hours, conformed to the publicly available Rockwell Spec No. MBO 135-102, Type 1, Class 2, is positioned under the silicon carbide fabric.

Alternatively, this layer is made of aluminoborosilicate NEXTEL7312 insulation, or alumina known as Saffil7, available from Babcock & Wilcox, Augusta, Ga.

Interior Layer: Alumino-borosilicate fabric known as NEXTEL7 312, TYPE AF-9, yarn count 1259×1259 per meter 4 harness satin, 185 g/square meter, obtained from 3M Corp., St. Paul, Minn., or silicon carbide fabric having an interlock design.

Intermediate layer: The multilayer intermediate layer is made of alternating sheets of aluminum foil and honeycomb pattern foil. There are between 9-30 layers of both materials or 9-30 of only honeycomb foils.

The foils are available from Sheldahl, Inc. and selected from the following products:

Aluminized Kapton7, vacuum deposited aluminum on one side of 0.0003 inch Kapton, 0.007 g/in2, flat or honeycomb patterned.

Aluminized Kapton7 vacuum deposited aluminum on both sides of 0.0003 inch Kapton, 0.007 g/in2, flat or honeycomb patterned.

Aluminized Kapton7, vacuum deposited aluminum on both sides of 0.0003 inch Kapton with bonded ceramic scrim cloth (Orcon Corp.) 14 oz/yd2. Vacuum deposited aluminum is 12 microns thick with a typical solar absorbance of 0.14 and typical room temperature emittance of 0.05, flat or honeycomb patterned.

Other layers are generally chosen from aluminoboro-silicate scrim, silica felt and/or polyamide film. Aluminoborosilicate scrim cloth is constructed from NEXTEL7312 yarn, 600 denier, 275×275 yarns/meter, 52 per square meter is obtained from 3M Corp. Silica felt is made of Astroquartz7II material obtained from J. P. Stevens & Co., Inc. The polyamide film is Kapton7 obtained from Sheldahl, Inc.

The intermediate layer is situated between the exterior and interior layers.

In the process of fabrication, these three layers are placed over each other starting with silicon carbide fabric used as an interior layer, the intermediate layer made of foil sheets are positioned above the interior layer, and the exterior layer is used as the extreme top surface during fabrication.

All of these layers are sewn together using a ceramic thread. Thread used at the top is either zirconia thread, TYR-ANNO FIBER7 thread, silica, silicon nitride or silicon carbide. These threads are available from 3M Corporation, Nippon Corporation, Dow Corning or Fabric Development, Inc., with the following characteristics. Silicon carbide thread, 2 ply silicon carbide NICALON7 NLM 202 constructed from 900 denier yarn, 3.1 2-twist per inch, used with Rayon/Dacron yarn. The bottom thread is ABS NEXTEL7 312, type AT-21 obtained from 3M Company.

Sewing is performed with a heavy-duty multi-needle sewing machine available from Adler Corporation, Frankfurt, West Germany. Stitch count is five, plus or minus two, stitches per inch. Stitch pattern is 2.5 cm by 2.5 cm.

What is claimed is:

1. A fire-resistant structure or object protected with a fire-resistant insulation having a thermo-insulating gradient, said insulation comprising of a one-ply or two-ply blanket or sheath insulation capable of withstanding temperatures above 1200° C. for more than fifteen minutes, wherein said insulation covers said structure, is built into said structure or is attached to said structure, wherein said insulation is a one-ply or two-ply blanket insulation with each ply comprising an exterior layer, an intermediary layer and an interior layer, wherein said exterior layer is positioned at an outermost exterior side of the insulation and is made of one or a plurality of sheets of a material selected from the group consisting of silica, aluminoborosilicate, silicon carbide fabric, aluminized film, aluminized foil or organometallic polymer and wherein said exterior layer is capable of withstanding temperature from about 1200° C. to up to about 2000° C.;

wherein said interior layer is positioned at an innermost backside of the insulation facing said structure or object and is made of one or plurality of sheets of a material selected from the group consisting of silicon carbide fabric, scrim fabric containing aluminoborosilicate, scrim fabric containing silica, felt containing silica, felt containing alumina, felt containing aluminoborosilicate, polyimide film, polyvinyl fluoride film, polyether ketone film, polyimide film containing gold, polyimide film aluminized on one or both sides, aluminized film, aluminized foil, organometallic polymer, mat containing silica and mat containing aluminoborosilicate and wherein said interior layer is capable of protecting said structure or object from reaching temperatures over about 300° C.;

wherein said intermediary layer is positioned between said exterior and said interior layers and comprises a plurality of flat or honeycomb sheets of the same or different material selected from the group consisting of silica, aluminoborosilicate, silicon carbide fabric, aluminized film, aluminized foil, organometallic polymer and polyimide film aluminized on one or both sides; and wherein said insulation comprising said three layers has the thermo-insulating gradient where at the exterior layer, said fire-resistant insulation has a fire-resistance capability to withstand fire having temperatures above 1200° C. and up to about 2000° C., and at the interior layer facing a structure or object to be fire-protected, said fire-resistant insulation has a capability to maintain and provide a shield for temperatures not exceeding 300° C. in said structure or object.

2. The structure or object of claim 1 wherein said material used for said exterior or interior layer is silica, aluminoborosilicate, silicon carbide fabric, aluminized film, aluminized foil or organometallic polymer.

3. The structure or object of claim 1 wherein said intermediate layer is made of alternating sheets of the flat aluminized foil and honeycomb aluminized foil and wherein there are between nine and thirty sheets of one or both materials.

4. The structure or object of claim 1 wherein said insulation is a one-ply sheath having thickness from about 0.1 to about 1 cm wherein said sheath comprises one to five layers of silica, aluminoborosilicate, silicon carbide fabric, aluminized film, aluminized foil or organometallic polymer.

5. The structure or object of claim 1 wherein said structure is a house, building, warehouse, garage, shed, hangar, and wherein said object is a man-made or naturally occurring ground, garden, tree, lawn, bush, brush, soil, garden or forest.

6. The structure or object of claim 5 wherein said structure or object is made of or has a built-in said fire-resistant insulation, comprises such insulation, is covered with such insulation or wherein such insulation is separate of said structure or object and is used to cover said structure or object in case of fire.

7. The structure or object of claim 6 wherein when said structure is made or built of said insulation, said insulation is attached to a fire-resistant structural support or wherein such insulation further comprises elements providing such structural support.

8. The structure or object of claim 7 wherein when said structure comprises said insulation, said insulation is built into walls, roofs, windows or doors of said structure, into grounds surrounding said structure or is built into or attached to said structure as a mechanically or manually releasable component.

9. A method for fire-protection of a structure or object said method comprising steps:
(a) providing a lightweight fire-resistant insulation having a thermo-resistant gradient capable of withstanding exterior temperatures from about 1200° C. to about 2000° C. and protecting said structure or object from temperatures reaching above 300° C.;
wherein said insulation is a blanket or a sheath insulation comprising:
an exterior layer positioned at an outermost exterior side of the insulation and is made of one or a plurality of sheets of a material selected from the group consisting of silica, aluminoborosilicate, silicon carbide fabric, aluminized film, aluminized foil or organometallic polymer, said exterior layer capable of withstanding temperature from about 1200° C. to up to about 2000° C.;
an interior layer positioned at an innermost backside of the insulation facing said structure or object wherein said interior layer is made of one or plurality of sheets of a material selected from the group consisting of silicon carbide fabric, scrim fabric containing aluminoborosilicate, scrim fabric containing silica, felt containing silica, felt containing alumina, felt containing aluminoborosilicate, polyimide film, polyvinyl fluoride film, polyether ketone film, polyimide film containing gold, polyimide film aluminized on one or both sides, aluminized film, aluminized foil, organometallic polymer, mat containing silica and mat containing aluminoborosilicate,
said interior layer providing a protective shield for said structure or object such that said structure is subjected to temperatures under about 300° C.; and
an intermediary layer comprising a plurality of flat or honeycomb sheets of the same or different material selected from the group consisting of silicon carbide fabric, scrim fabric containing aluminoborosilicate, scrim fabric containing silica, felt containing silica, felt containing alumina, felt containing aluminoborosilicate, polyimide film, polyvinyl fluoride film, polyether ketone film, aluminum foil, polyimide film containing gold, polyimide film containing aluminum, alumina coated film, alumina coated foil, organometallic polymer, mat containing silica and mat containing aluminoborosilicate;
wherein said insulation has thickness from about 0.1 to about 5 cm; and
(b) attaching said insulation to said structure such that said structure is made of said insulation, said insulation is built into said structure, said insulation covers said structure or such insulation is separate from said structure and is used to cover or be deployed or erected around and over said structure in case of fire.

10. The method of claim 9 wherein said insulation has exterior to interior thermal gradient of from about 1200° C. to about 120° C. achieved by multiple layers of materials having different thermo-resistant properties wherein an exterior layer is positioned at an outermost exterior side of the insulation that covers said structure or object and is capable of withstanding temperature of up to 2000° C. and wherein an interior layer positioned at an innermost side of the insulation that covers said structure or object provides an insulation for said structure wherein in case of a fire said structure or object is subjected to a temperatures not exceeding about 120° C.

11. The method of claim 10 wherein said insulation is a permanent insulation built into a wall, roof, window or door of said structure or permanently stored in an above the ground or underground compartment surrounding said structure or object.

12. The method of claim 11 wherein said permanently stored insulation comprises means for deployment and erection of said insulation around said structure or object in case of fire.

13. The method of claim 10 wherein said insulation is a portable temporary insulation.

14. The method of claim 13 wherein said portable temporary insulation is stored separately from the structure and is brought to the structure or object in case of fire.

15. The method of claim 14 wherein said portable insulation is a two-ply inflatable insulation comprising means for inflating said insulation over said structure or object in case of fire.

16. The method of claim 15 wherein said insulation inflated over said structure or object is deflated and essentially covers said structure or object impermeably.

17. The method of claim 11 further comprising steps of making or building said structure using said insulation alone or in combination with other structural elements.

18. The method of claim 11 further comprising steps of attaching said insulation to a fire-resistant structural support or providing an insulation that comprises a structural support.

19. The method of claim 11 wherein when said insulation is built into walls, roofs, windows or doors of said structure, into grounds surrounding said structure or is built into or attached to said structure, it further comprises a mechanically or manually releasable component and a step for mechanical or manual release of said insulation in order to protect said structure or object from fire.

20. A fire-resistant insulation
- comprising of a one-ply or two-ply blanket or sheath insulation with each ply comprising an exterior layer, an intermediary layer and an interior layer,
- wherein said exterior layer is positioned at an outermost exterior side of the insulation and is made of one or a plurality of sheets of a material selected from the group consisting of silica, aluminoborosilicate, silicon carbide fabric, aluminized film, aluminized foil or organometallic polymer;
- wherein said interior layer is positioned at an innermost backside of the insulation is made of one or plurality of sheets of a material selected from the group consisting of silicon carbide fabric, scrim fabric containing aluminoborosilicate, scrim fabric containing silica, felt containing silica, felt containing alumina, felt containing aluminoborosilicate, polyimide film, polyvinyl fluoride film, polyether ketone film, aluminum foil, polyimide film containing gold, polyimide film aluminized on one or both sides, aluminized film, aluminized foil, organometallic polymer, mat containing silica and mat containing aluminoborosilicate, wherein said intermediary layer is positioned between said exterior and said interior layer and comprises a plurality of flat or honeycomb sheets of the same or different material selected from the group consisting of silica, aluminoborosilicate, silicon carbide fabric, aluminized film, aluminized foil, organometallic polymer or the polyimide film aluminized on one or both sides; and
- wherein on the exterior side of the insulation, the insulation withstands temperatures up to 2000° C. and wherein on the interior side, the insulation provides a shield for structures to be protected to reach temperatures from 120° C. and not exceeding 300° C.

21. The structure or object of claim 1 wherein said interior layer is capable of protecting said structure or object from reaching temperatures over about 120° C.

* * * * *